(12) United States Patent
Higashimata et al.

(10) Patent No.: US 6,928,357 B2
(45) Date of Patent: Aug. 9, 2005

(54) TORQUE-CONVERTER SLIP CONTROL SYSTEM

(75) Inventors: Akira Higashimata, Kanagawa (JP); Satoshi Segawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 75 days.

(21) Appl. No.: 10/700,446

(22) Filed: Nov. 5, 2003

(65) Prior Publication Data

US 2004/0111203 A1 Jun. 10, 2004

(30) Foreign Application Priority Data

Dec. 5, 2002 (JP) ........................................ 2002-383017

(51) Int. Cl.[7] .............................................. G06F 7/00
(52) U.S. Cl. .............................. 701/87; 701/90; 477/34
(58) Field of Search .............................. 701/84, 87, 90; 477/34

(56) References Cited

FOREIGN PATENT DOCUMENTS

JP          09265745 A  * 10/1997    ............ G11B/21/02
JP          2000-145948 A    5/2000

* cited by examiner

Primary Examiner—Yonel Beaulieu
(74) Attorney, Agent, or Firm—Foley & Lardner LLP

(57) ABSTRACT

A slip control system of a lockup torque converter includes a pre-compensator that pre-compensates for a target slip-rotation speed to produce a target slip-rotation speed correction value. A feedback compensator is provided to feedback-control an engagement capacity of a lock-up clutch based on a deviation between the target slip-rotation speed correction value and an actual slip-rotation speed to bring the actual slip-rotation speed closer to the target slip-rotation speed. Also provided is a dead-time processing section that compensates for the target slip-rotation speed correction value to reflect a dead time of dynamic characteristics peculiar to the slip control system in the target slip-rotation speed correction value. The dead-time compensated output is fed to the feedback compensator. The dead time is variable in accordance with a predetermined dead time characteristic.

20 Claims, 11 Drawing Sheets

FIG.7A ENGINE SPEED Ne
FIG.7B PRIMARY SPEED ω_TR
FIG.7C TARGET SLIP-ROTATION SPEED ω_SLPT
FIG.7D DIFFERENTIAL PRESSURE (P_A−P_R)
FIG.7E VEHICLE SPEED VSP
FIG.7F THROTTLE OPENING TVO

TORQUE-CONVERTER SLIP CONTROL SYSTEM

TECHNICAL FIELD

The present invention relates to a slip control system of a so-called lock-up torque converter for an automatic transmission including a continuously variable transmission, and specifically to the improvement of an automatic slip lock-up control technology that a speed of relative rotation between input and output elements of a transmission torque-converter lockup clutch, that is, a slip-rotation speed of the lock-up torque converter is converged or brought closer to a desired value (a target slip-rotation speed).

BACKGROUND ART

As is generally known, a torque converter has merits including a torque-fluctuations absorption function owing to power transmission between input and output elements via fluid and a torque-multiplication function, and demerits including a loss of torque, in other words, a reduced torque transmission efficiency. For the reasons discussed above, recently, automotive vehicles often use lock-up torque converters in which input and output elements (pump and turbine elements) can be directly coupled with each other by a lockup clutch under engine/vehicle operating conditions that do not require a torque-fluctuations absorption function and a torque-multiplication function to eliminate internal slippage and improve fuel economy, or a slip-rotation speed of the lockup torque converter, that is, a speed difference between the input and output elements can be controlled or adjusted properly by way of slip lockup control for the lockup clutch depending on engine/vehicle operating conditions.

One such slip lockup control system for a transmission torque-converter lockup clutch has been disclosed in Japanese Patent Provisional Publication No. 2000-145948 (hereinafter is referred to as "JP2000-145948"). In the torque-converter slip control system of JP2000-145948, a target slip-rotation speed is calculated or estimated based on engine/vehicle operating conditions, and also an actual slip-rotation speed corresponding to the rotation-speed difference between input and output elements is detected and calculated. The target slip-rotation speed is compensated for by means of a pre-compensator to produce a target slip-rotation speed correction value. The torque-converter slip control system performs a feedback control based on the deviation between the actual slip-rotation speed and the target slip-rotation speed correction value, to feedback-control a capacity of engagement of the lockup clutch so that the actual slip-rotation speed is brought closer to the target slip-rotation speed.

SUMMARY OF THE INVENTION

At early stages of transmission torque-converter slip lock-up control executed just after the slip lock-up control has been initiated, the lockup clutch engagement pressure is risen generally by way of feed-forward control (open-loop control). In contrast, at the latter stage of slip lock-up control (simply, slip control) executed just after the actual slip-rotation speed reduces to below a slip-rotation speed criterion determined based on a throttle opening or an accelerator opening, an electronic control unit determines that the actual slip-rotation speed begins to respond to the controlled lockup clutch engagement pressure and the operating state of the lockup clutch has been shifted to the slip lockup state. Thus, the lockup clutch control operating mode is switched from feedforward control to feedback control (closed-loop control), in order to perform the slip control by way of the feedback control. At the switching point from feedforward control to feedback control, the target slip-rotation speed correction value (corresponding to the transient response of the pre-compensator) is initialized to an initial value (see FIG. 14). Thereafter, as can be appreciated from the target slip-rotation speed correction value characteristic curve shown in FIG. 14, the target slip-rotation speed correction value is gradually reduced with the lapse of time, taking into account a dynamic characteristic of the slip lock-up control system.

During switching to feedback control, the lockup clutch engagement pressure tends to rise with a response delay, and therefore the actual slip-rotation speed tends to drop with a response delay. During such a transition from feedforward control to feedback control, as seen from the characteristic curve of FIG. 14, a drop of the target slip-rotation speed correction value (corresponding to the transient response of the pre-compensator) further develops. This causes a great deviation of the target slip-rotation speed correction value from the actual slip-rotation speed, thereby deteriorating the follow-up performance of the slip control system. Therefore, in order to optimally compensate for the transient response of the pre-compensator after switching to the slip lock-up feedback control, the pre-compensator included in the slip lock-up control system is initialized such that the target slip-rotation speed correction value is initialized to the latest up-to-date information regarding the actual slip-rotation speed just after switching to the feedback control.

Actually, within the slip lock-up control system, there is a dead time from a time when a control command for slip lock-up control is outputted to a time when the lock-up clutch engagement capacity begins to vary actually.

As described previously, the target slip-rotation speed correction value (corresponding to the transient response of the pre-compensator, in other words, the output signal value of the pre-compensator) is determined and retrieved from the characteristic curve of FIG. 14, taking into account the dynamic characteristic of the slip lock-up control system. However, of dynamic characteristics peculiar to the slip lock-up control system, the previously-discussed dead time is not taken into account. Thus, there is a disadvantage that the target slip-rotation speed correction value always contains an error corresponding to the dead time. It is desirable to more precisely suitably compensate for the output signal value from the pre-compensator, that is, the target slip-rotation speed correction value, while adequately taking into account the error corresponding to the dead time from the time when the command for slip lock-up control is outputted to the time when the lock-up clutch engagement capacity begins to vary actually.

Accordingly, it is an object of the invention to provide a torque-converter slip control system, capable of avoiding the aforementioned disadvantages by more precisely compensating for an output from a pre-compensator that pre-compensating a target slip-rotation speed determined based on engine/vehicle operating conditions, taking into account a dead time included in dynamic characteristics peculiar to the slip control system.

In order to accomplish the aforementioned and other objects of the present invention, a slip control system of an automatic transmission with a torque converter, comprises a lockup clutch, which is disposed between input and output elements of the torque converter, and whose engagement capacity is changeable for adjusting an actual slip-rotation speed between the input and output elements, and a control unit that feedback-controls the engagement capacity, the control unit comprising a target slip-rotation speed calculation section that estimates a target slip-rotation speed based on engine-and-vehicle operating conditions, a pre-compensating section that pre-compensates for the target slip-rotation speed to produce a target slip-rotation speed correction value, a slip-rotation speed deviation calculation section that calculates a slip-rotation speed deviation between the target slip-rotation speed correction value and the actual slip-rotation speed, a feedback compensating section that feedback-controls the engagement capacity based on the slip-rotation speed deviation to bring the actual slip-rotation speed closer to the target slip-rotation speed, and a dead-time processing section that compensates for the target slip-rotation speed correction value, considering a dead time of dynamic characteristics peculiar to the slip control system in the target slip-rotation speed correction value, to supply a dead-time compensated output to the feedback compensating section.

According to another aspect of the invention, a slip control system of an automatic transmission with a torque converter, comprises a lockup clutch, which is disposed between input and output elements of the torque converter, and whose engagement capacity is changeable for adjusting an actual slip-rotation speed between the input and output elements, and a control unit that feedback-controls the engagement capacity of the lock-up clutch, the control unit comprising a target slip-rotation speed calculation section that estimates a target slip-rotation speed based on engine-and-vehicle operating conditions, a pre-compensating section that pre-compensates for the target slip-rotation speed to produce a target slip-rotation speed correction value, a slip-rotation speed deviation calculation section that calculates a slip-rotation speed deviation between the target slip-rotation speed correction value and the actual slip-rotation speed, a feedback compensating section that feedback-controls the engagement capacity of the lock-up clutch based on the slip-rotation speed deviation to bring the actual slip-rotation speed closer to the target slip-rotation speed, and a dead-time processing section that compensates for the target slip-rotation speed correction value to reflect a dead time of dynamic characteristics peculiar to the slip control system in the target slip-rotation speed correction value, and supplies a dead-time compensated output to the feedback compensating section, the dead time being variable in accordance with a predetermined dead time characteristic.

According to a further aspect of the invention, a slip control system of an automatic transmission with a torque converter, comprises a lockup clutch, which is disposed between input and output elements of the torque converter, and whose engagement capacity is changeable for adjusting an actual slip-rotation speed between the input and output elements, a slip control valve that is responsive to a signal pressure for changing a differential pressure between a lockup-clutch apply pressure and a lockup-clutch release pressure, a lockup solenoid valve that generates the signal pressure in response to a drive signal for changing the differential pressure via the slip control valve, and a control unit that feedback-controls the engagement capacity of the lock-up clutch by outputting the drive signal to the lockup solenoid valve, the control unit comprising a target slip-rotation speed calculation section that estimates a target slip-rotation speed based on engine-and-vehicle operating conditions, a pre-compensating section comprising a first compensating filter that pre-compensates for the target slip-rotation speed to produce a first target slip-rotation speed correction value corresponding to a reference-model output from an expression $\omega_{SLPTC1} = G_R(s) \times \omega_{SLPT}$ where $\omega_{SLPTC1}$ is the first target slip-rotation speed correction value, $G_R(s)$ is a reference model that is set as a transfer function suited to a desired response determined based on designer's wishes, and $\omega_{SLPT}$ is the target slip-rotation speed, and a second compensating filter that pre-compensates for the target slip-rotation speed to produce a second target slip-rotation speed correction value from an expression $\omega_{SLPTC2} = G_M(s) \times \omega_{SLPT}$ where $G_M(s)$ corresponds to a feed-forward compensator, which is defined by an expression $G_M(s) = G_R(s)/P(s)$, where $G_R(s)$ is the reference model and $P(s)$ is a transfer function that is obtained by modeling a lockup-clutch slip-rotation section serving as a controlled system, a slip-rotation speed deviation calculation section that calculates a slip-rotation speed deviation between the target slip-rotation speed correction value and the actual slip-rotation speed, a feedback compensating section that feedback-controls the engagement capacity of the lock-up clutch based on the slip-rotation speed deviation to bring the actual slip-rotation speed closer to the target slip-rotation speed, the feedback compensating section comprising a feedback compensator that produces a first slip-rotation speed command value suited to reduce the slip-rotation speed deviation and an adder that produces a slip-rotation speed command value by adding the first slip-rotation speed command value to the second target slip-rotation speed correction value, a dead-time processing section that compensates for the first target slip-rotation speed correction value to reflect a dead time of dynamic characteristics peculiar to the slip control system in the first target slip-rotation speed correction value, and supplies a dead-time compensated output to the feedback compensator, the dead time being variable in accordance with a predetermined dead time characteristic, and a drive signal determination section that determines the drive signal based on the slip-rotation speed command value.

According to a still further aspect of the invention, a slip control system of an automatic transmission with a torque converter, comprises a lockup clutch, which is disposed between input and output elements of the torque converter, and whose engagement capacity is changeable for adjusting an actual slip-rotation speed between the input and output elements, and a control unit that feedback-controls the engagement capacity, the control unit comprising a target slip-rotation speed calculation means for estimating a target slip-rotation speed based on engine-and-vehicle operating conditions, a pre-compensating means for pre-compensating for the target slip-rotation speed to produce a target slip-rotation speed correction value, a slip-rotation speed deviation calculation means for calculating a slip-rotation speed deviation between the target slip-rotation speed correction value and the actual slip-rotation speed, a feedback compensating means for feedback-controlling the engagement capacity based on the slip-rotation speed deviation to bring the actual slip-rotation speed closer to the target slip-rotation speed, and a dead-time processing means for compensating for the target slip-rotation speed correction value, considering a dead time of dynamic characteristics peculiar to the slip control system in the target slip-rotation speed correction value, to supply a dead-time compensated output to the feedback compensating section.

According to another aspect of the invention, a method of controlling a speed of relative rotation between input and output elements of a lockup torque converter of an automatic transmission employing a lockup clutch, which is disposed between the input and output elements, and whose engagement capacity is changeable for adjusting an actual slip-rotation speed between the input and output elements, the method comprising estimating a target slip-rotation speed based on engine-and-vehicle operating conditions, pre-compensating for the target slip-rotation speed to produce a target slip-rotation speed correction value, calculating a slip-rotation speed deviation between the target slip-rotation speed correction value and the actual slip-rotation speed, feedforward-controlling the engagement capacity by open-loop control for a first time period of an automatically locked-up time period during which the lockup clutch shifts from a release state to a fully-engaged state, feedback-controlling the engagement capacity of the lock-up clutch based on the slip-rotation speed deviation to bring the actual slip-rotation speed closer to the target slip-rotation speed for a second time period of the automatically locked-up time period, and compensating for the target slip-rotation speed correction value to reflect a dead time of dynamic characteristics peculiar to a slip control system in the target slip-rotation speed correction value, the dead time being variable in accordance with a predetermined dead time characteristic, so that at a switching point from the feedforward control to the feedback control the dead time is reset to zero, and that the dead time is variably adjusted to gradually increase from zero to a predetermined dead-time equivalent value peculiar to the slip control system with a predetermined transition time period from the switching point.

The other objects and features of this invention will become understood from the following description with reference to the accompanying drawings.

DESCRIPTION OF THE PREFERRED EMBODIMENTS

Figure 1:
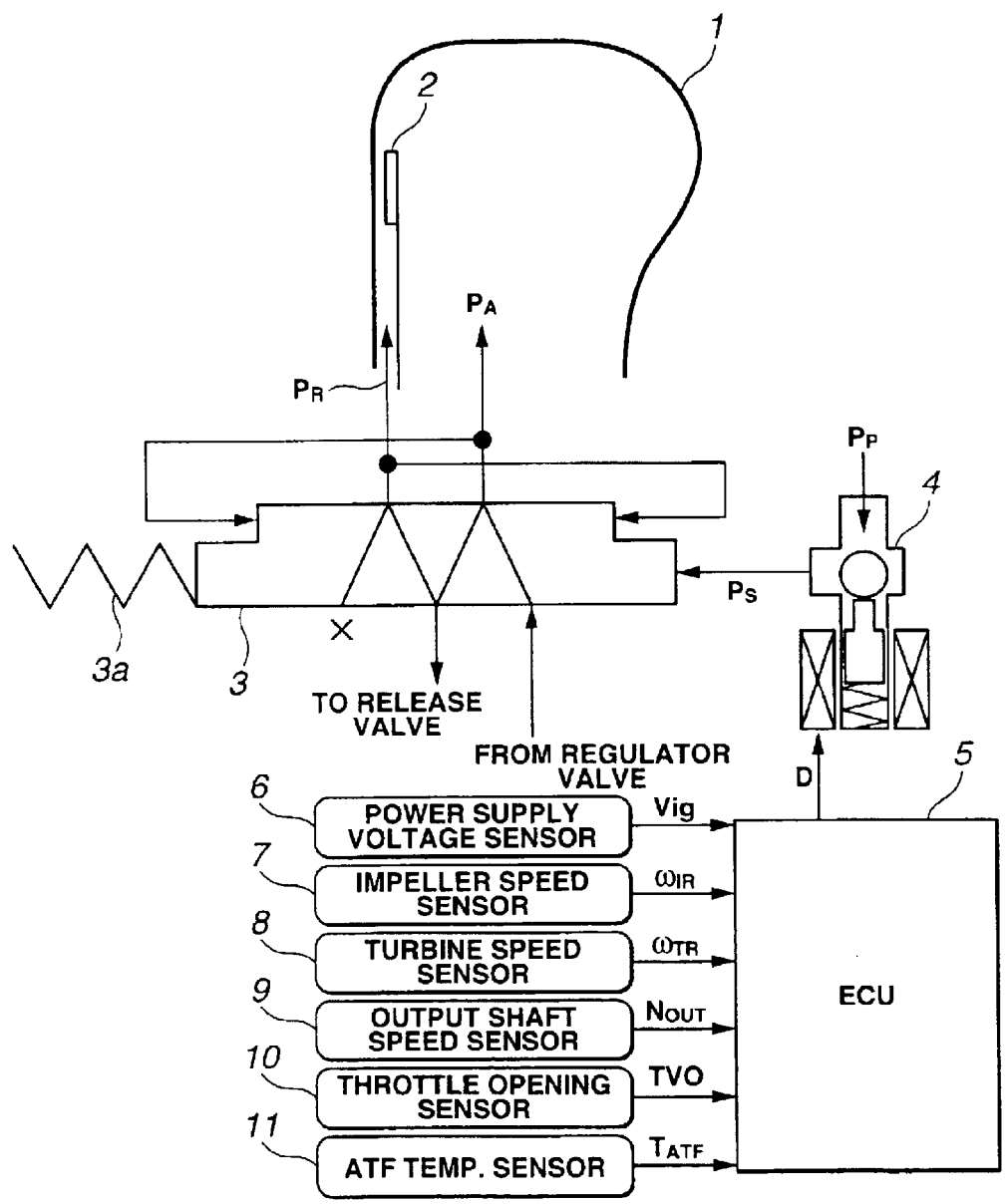
FIG. 1 is a system block diagram illustrating an embodiment of a torque-converter slip lock-up control system (simply, a slip control system).

Referring now to the drawings, particularly to FIG. 1, there is shown the torque-converter slip lock-up control system of the embodiment. For the sake of simplicity, detailed description of the structure of a lock-up torque converter 1 is omitted because torque converter 1 is generally known. As seen from the schematic view of FIG. 1, torque converter 1 is comprised of a pump impeller (not numbered) serving as a torque-converter input element that is connected to and rotates in synchronism with rotation of the engine crankshaft, a turbine runner (not numbered) serving as a torque-converter output element that is connected to an input shaft of a transmission gear train of an automatic transmission, and a lockup clutch 2 via which the pump impeller (torque-converter input element) and the turbine runner (torque-converter output element) are directly coupled to and fully engaged with each other under predetermined engine/vehicle operating conditions that do not require the torque-fluctuations absorption function and torque-multiplication function so as to eliminate internal slippage and improve fuel economy, or the pump impeller (torque-converter input element) and the turbine runner (torque-converter output element) are partially engaged with each other in accordance with slip lockup control for lockup clutch 2. The magnitude of lockup-clutch engagement force of lockup clutch 2 is determined depending on the differential pressure ($P_A$–$P_R$) between a lockup-clutch apply pressure (simply, apply pressure) $P_A$ and a lockup-clutch release pressure (simply, release pressure) $P_R$. The differential pressure ($P_A$–$P_R$) means a lockup clutch engagement pressure.

When apply pressure $P_A$ is lower than release pressure $P_R$, lockup clutch 2 is released (or disengaged) and therefore torque converter 1 is operated in a torque-converter state (simply, a converter state) that the pump impeller and the turbine runner are uncoupled to each other and thus slip lockup control (slip control) for the speed of relative rotation between the pump impeller and the turbine runner (input and output elements), that is, the slip-rotation speed of lock-up torque converter 1 is not made.

Conversely when apply pressure $P_A$ is higher than release pressure $P_R$ and differential pressure ($P_A$–$P_R$) is below a predetermined differential pressure, lockup clutch 2 is engaged by the lockup-clutch engagement force corresponding to differential pressure ($P_A$–$P_R$). Under this condition, the speed of relative rotation between torque-converter input and output elements, that is, the slip-rotation speed of lock-up torque converter 1 is controlled or adjusted depending on the magnitude of lockup-clutch engagement force corresponding to differential pressure ($P_A$–$P_R$). Such a partial lockup-clutch engagement state is referred to as a "slip-control state".

When differential pressure ($P_A$–$P_R$) exceeds the predetermined differential pressure, lockup clutch 2 shifts to a fully-engaged state in which there is no relative rotation between torque-converter input and output elements. Such a fully-engaged state is referred to as a "lockup state".

The magnitude of apply pressure $P_A$ and the magnitude of release pressure $P_R$ are regulated or controlled by means of a slip control valve 3. Actually, slip control valve 3 is responsive to a signal pressure $P_S$, which is output from a duty-cycle controlled lockup solenoid valve 4, for regulating or controlling apply pressure $P_A$ and release pressure $P_R$. Details of each of lockup solenoid valve 4 and slip control valve 3 are described hereunder.

As shown in FIG. 1, lockup solenoid valve 4 receives a constant pilot pressure $P_P$ (serving as an initial pressure) via an inlet port thereof, and outputs signal pressure $P_S$ from an outlet port thereof. Lockup solenoid valve 4 is designed to generate signal pressure $P_S$, so that the magnitude of signal pressure $P_S$ increases, as a desired solenoid-drive duty cycle value D of a duty cycle modulated pulsewidth signal (a solenoid drive signal $S_{DUTY}$) outputted from the output interface of electronic control unit (ECU) or lockup controller 5 increases.

On the other hand, slip control valve 3 is comprised of a spool valve having a spool, wherein pilot pressure $P_S$ from lockup solenoid valve 4 and release pressure $P_R$ fed back both act upon one side of the spool, and wherein as an opposing pressure a spring bias of a spring 3a and apply pressure $P_A$ fed back both act upon the other side of the spool. In accordance with a rise in signal pressure $P_S$ from lockup solenoid valve 4, the lockup-clutch engagement pressure, which corresponds to a differential pressure ($P_A$–$P_R$) between apply pressure $P_A$ and release pressure $P_R$, gradually rises from a negative value via "0" to a positive value, so that a transition from the converter state to the slip control state occurs. When signal pressure $P_S$ further rises, differential pressure ($P_A$–$P_R$), that is, the lockup-clutch engagement pressure exceeds the predetermined positive engagement-pressure value, so that a transition from the slip control state to the lockup state occurs. As can be appreciated from the above, the negative lockup-clutch engagement pressure ($P_A$–$P_R$), represented by the inequality $P_R > P_A$, means that torque converter 1 is operated in the converter state or means a shift from the other operating mode to the converter operating mode (the converter state). The positive lockup-clutch engagement pressure ($P_A$–$P_R$), represented by the inequality $P_R < P_A$ and less than the predetermined positive engagement-pressure value, means that torque converter 1 is operated in the slip control state. Therefore, in the slip control state, increasing the positive lockup-clutch engagement pressure ($P_A$–$P_R$) within a pressure range below a predetermined threshold value (the predetermined positive engagement-pressure value) means an increase in the lockup-clutch engagement capacity. That is, differential pressure ($P_A$–$P_R$) is equal to the lockup clutch engagement pressure, and the capacity of engagement of lockup clutch 2 is proportion to the lockup clutch engagement pressure (differential pressure ($P_A$–$P_R$)). The speed of relative rotation between torque-converter input and output elements, that is, the slip-rotation speed of lockup torque converter 1 tends to reduce, as the lockup-clutch engagement capacity increases. When the positive lockup-clutch engagement pressure ($P_A$–$P_R$) reaches the predetermined positive engagement-pressure value and thus the lockup-torque-converter slip-rotation speed (the speed difference between input and output elements) becomes zero, a transition from the slip control state to the lockup state occurs.

As shown in FIG. 1, ECU (lockup controller) 5 generally comprises a microcomputer. ECU 5 includes an input/output interface (I/O), memories (RAM, ROM), and a microprocessor or a central processing unit (CPU). The input/output interface (I/O) of ECU 5 receives input information from various engine/vehicle sensors, namely a power supply voltage sensor 6, an impeller speed sensor 7, a turbine speed sensor 8, an output shaft speed sensor 9, a throttle opening sensor 10 and an automatic transmission fluid (ATF) temperature sensor 11. Power supply voltage sensor 6 is provided to detect an electric power supply voltage $V_{ig}$. Impeller speed sensor 7 is provided to detect a rotational speed of the pump impeller, simply an impeller speed $\omega_{IR}$, equal to the engine speed. Turbine speed sensor 8 is provided to detect a rotational speed of the turbine runner, simply a turbine speed $\omega_{TR}$, equal to the torque-converter output speed. Output shaft speed sensor 9 is provided to detect a transmission output speed $N_{OUT}$, which is regarded as a vehicle speed VSP. Throttle opening sensor 10 is provided to detect a throttle opening TVO, which is regarded as an engine load. ATF temperature sensor 11 is provided to detect a working-fluid temperature $T_{ATF}$ of the automatic transmission (or torque converter 1). Within ECU 5, the central processing unit (CPU) allows the access by the I/O interface of input informational data signals from the previously-discussed engine/vehicle sensors 6–11. The CPU of ECU 5 is capable of performing necessary arithmetic and logic operations, for example, a plurality of arithmetic operations shown in FIG. 2 in the form of the block diagram needed to determine the previously-discussed solenoid drive signal $S_{DUTY}$ having a desired solenoid-drive duty cycle value D, and compensating for desired solenoid-drive duty cycle value D based on a signal from power supply voltage sensor 6, indicative of electric power supply voltage $V_{ig}$, and consequently performing the predetermined slip control described later. Computational results (arithmetic calculation results), that is, calculated output signals, for example solenoid drive signal $S_{DUTY}$ having desired solenoid-drive duty cycle value D, are relayed through the output interface circuitry of ECU 5 to output stages, namely lockup solenoid valve 4 included in the torque-converter slip control system.

Figure 2:
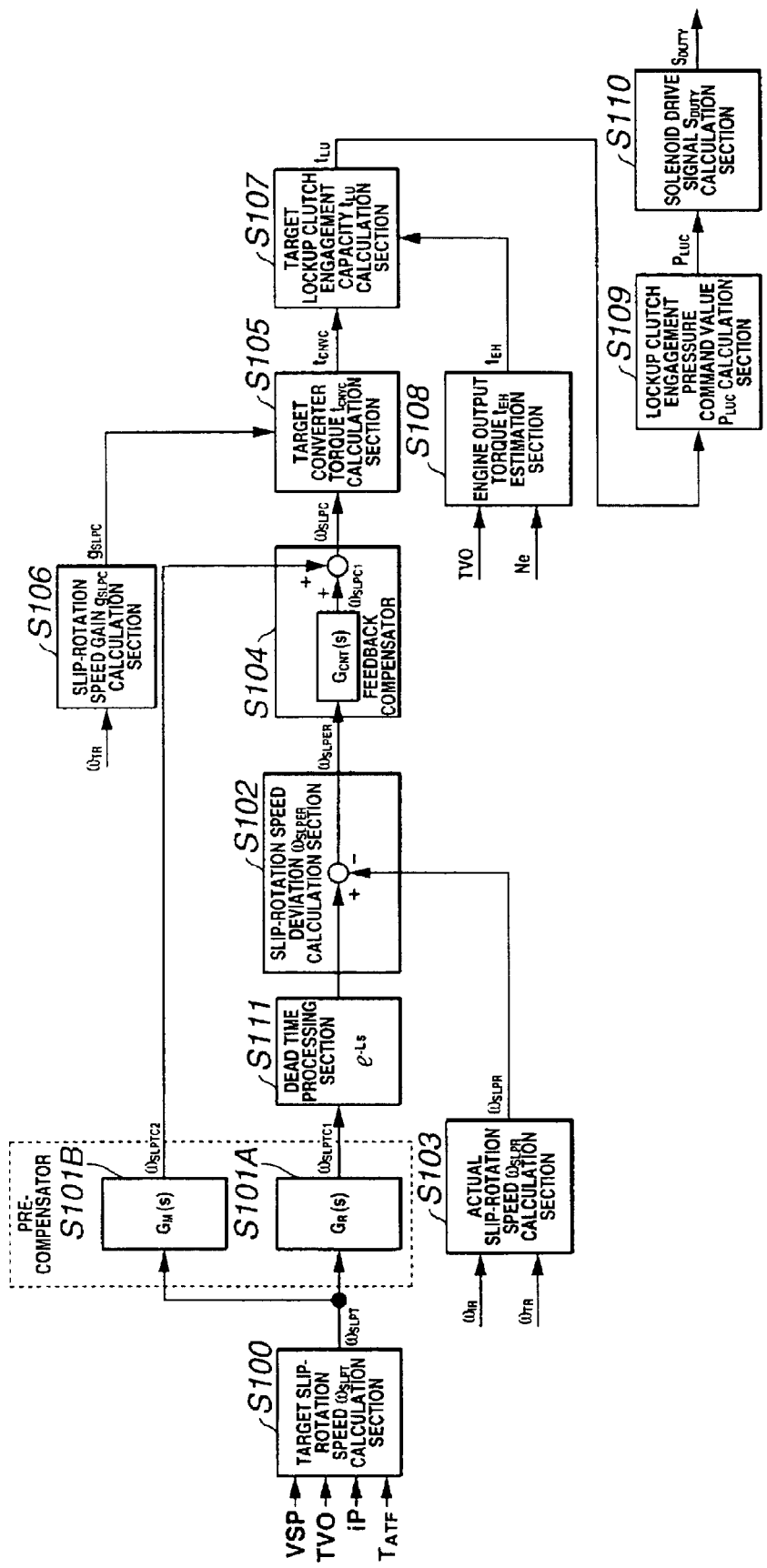
FIG. 2 is a block diagram illustrating a plurality of arithmetic processing sections, compensating sections, and an estimating section, needed for slip lock-up control executed by an electronic control unit (ECU) of the slip control system of the embodiment.

Referring now to FIG. 2, details of essential arithmetic-processing, compensating, and estimating sections, needed for slip lock-up control executed by the slip control system of the embodiment, are shown in the form of the block diagram.

In FIG. 2, a target slip-rotation speed $\omega_{SLPT}$ calculation section S100 estimates, calculates or sets a target slip-rotation speed $\omega_{SLPT}$ based on engine/vehicle operating conditions, such as vehicle speed VSP (estimated by transmission output speed $N_{OUT}$ detected by output shaft speed sensor 9), throttle opening TVO, working-fluid temperature $T_{ATF}$ detected by ATF temperature sensor 11, and a selected gear ratio of the transmission (a selected transmission ratio) iP, taking account of less torque fluctuations and low noise/vibrations level, for example low booming noise.

An actual slip-rotation speed $\omega_{SLPR}$ calculation section S103 arithmetically calculates an actual slip-rotation speed $\omega_{SLPR}$ (=$\omega_{IR}-\omega_{TR}$) by subtracting turbine speed $\omega_{TR}$ from impeller speed $\omega_{IR}$. Impeller speed $\omega_{IR}$ (i.e., torque-converter input speed) is equivalent to engine speed Ne, whereas turbine speed $\omega_{TR}$ (i.e., torque-converter output speed) is equivalent to a primary rotational speed of the transmission.

A pre-compensator denoted by reference signs S101A and S101B calculates a first target slip-rotation speed correction value $\omega_{SLPTC1}$ through a first compensating filter S101A and also calculates a second target slip-rotation speed correction value $\omega_{SLPTC2}$ through a second compensating filter S101B, in such a manner as to pre-compensate for target slip-rotation speed $\omega_{SLPT}$ and set the same ($\omega_{SLPT}$) to a desired response that is determined based on the designer's wishes. Concretely, within the first compensating filter S101A, first target slip-rotation speed correction value $\omega_{SLPTC1}$ is calculated from the following expression (1).

$$\omega_{SLPTC1}=G_R(S)\times\omega_{SLPT} \quad (1)$$

where $G_R(s)$ is a reference model that is set as a transfer function suited to the desired response determined based on the designer's wishes, and $\omega_{SLPT}$ denotes the target slip-rotation speed calculated through target slip-rotation speed $\omega_{SLPT}$ calculation section S100. That is, first target slip-rotation speed correction value $\omega_{SLPTC1}$ corresponds to a reference-model output.

Within the second compensating filter S101B, second target slip-rotation speed correction value $\omega_{SLPTC2}$ is calculated from the following expression (2).

$$\omega_{SLPTC2}=G_M(S)\times\omega_{SLPT} \quad (2)$$

where $G_M(s)$ corresponds to a feed-forward (FF) compensator, which is defined by an expression $G_M(s)=G_R(s)/P(s)$, where $G_R(s)$ is the previously-discussed reference model and P(s) is a transfer function that is obtained by modeling a lockup-clutch slip-rotation section serving as a controlled system.

A slip-rotation speed deviation $\omega_{SLPER}$ calculation section S102 arithmetically calculates a slip-rotation speed error deviation (simply, a slip-rotation speed deviation) $\omega_{SLPER}$ between first target slip-rotation speed correction value $\omega_{SLPTC1}$ and actual slip-rotation speed $\omega_{SLPR}$.

A slip-rotation speed command value $\omega_{SLPC}$ calculation section S104 includes a feed-back (FB) compensator that functions to suppress or reduce the previously-noted slip-rotation speed deviation $\omega_{SLPER}$. In the system of the shown embodiment, the FB compensator of slip-rotation speed command value $\omega_{SLPC}$ calculation section S104 is comprised of a proportional-plus-integral (PI) controller with two terms in which the output of the PI controller is the sum of a proportional term and an integrating term, with an adjustable gain for each term. Concretely, the output from the PI controller (FB compensator S104), that is, a first slip-rotation speed command value $\omega_{SLPC1}$ is represented by the following expression (3).

$$\omega_{SLPC1}=K_P\cdot\omega_{SLPER}+(K_I/S)\cdot\omega_{SLPER} \quad (3)$$

where $K_P$ denotes a proportional gain (a proportional constant), $K_I$ denotes an integral gain (an integration constant), s denotes a differential operator, and $\omega_{SLPER}$ denotes the slip-rotation speed deviation calculated through slip-rotation speed deviation $\omega_{SLPER}$ calculation section S102. The output from slip-rotation speed command value $\omega_{SLPC}$ calculation section S104, that is, a slip-rotation speed command value $\omega_{SLPC}$, which is a control input, is arithmetically calculated by means of an adder that adds the output from the FB compensator, i.e., first slip-rotation speed command value $\omega_{SLPC1}$ to the output from of second compensating filter S101B of the pre-compensator, i.e., second target slip-rotation speed correction value $\omega_{SLPTC2}$ (see the following expression (4)).

$$\omega_{SLPC}=\omega_{SLPC1}+\omega_{SLPTC2}. \quad (4)$$

Figure 4:
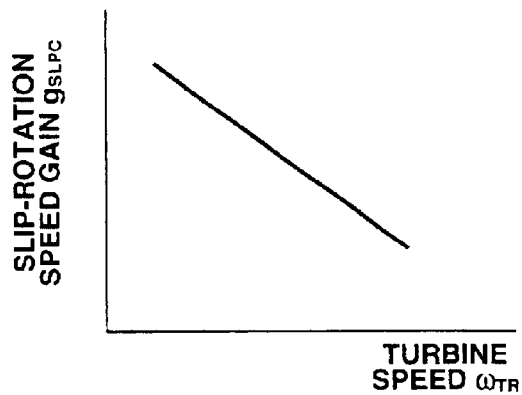
FIG. 4 is a turbine-speed $\omega_{TR}$ versus a slip-rotation speed gain $g_{SLPC}$ characteristic diagram.

A slip-rotation speed gain $g_{SLPC}$ calculation section S106 calculates or retrieves a slip-rotation speed gain $g_{SLPC}$ based on the latest up-to-date information regarding turbine speed $\omega_{TR}$ from the preprogrammed $\omega_{TR}$-$g_{SLPC}$ characteristic map shown in FIG. 4. Slip-rotation speed gain $g_{SLPC}$ is defined as a ratio of a slip-rotation speed to a torque-converter torque. Slip-rotation speed gain $g_{SLPC}$ varies depending on various engine/vehicle operating conditions, such as a drive state, that is, the vehicle's driving condition during which torque (power) is transferred from the engine to the drive wheels and a coast state, that is, the vehicle's coasting condition during which torque (power) is transferred from the drive wheels to the engine. Thus, slip-rotation speed gain $g_{SLPC}$ varies depending on turbine speed $\omega_{TR}$. For the reasons discussed above, slip-rotation speed gain $g_{SLPC}$ is determined based on the current value of turbine speed $\omega_{TR}$ from the preprogrammed $\omega_{TR}$-$g_{SLPC}$ characteristic map shown in FIG. 4.

A target converter torque $t_{CNVC}$ calculation section S105 arithmetically calculates a target converter torque $t_{CNVC}$ from the following expression (5)

$$t_{CNVC}=\omega_{SLPC}/g_{SLPC}. \quad (5)$$

Figure 5:
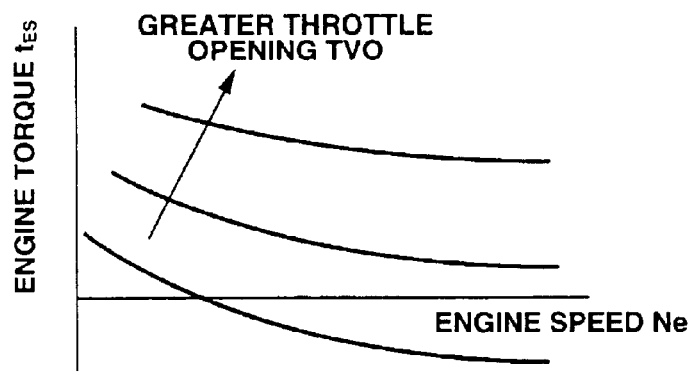
FIG. 5 is an engine torque performance curve showing the relationship between engine speed Ne and engine torque $t_{ES}$ at any throttle opening TVO.

An engine output torque $t_{EH}$ estimation section S108, first, determines or retrieves an engine torque $t_{ES}$ based on engine speed Ne and throttle opening TVO from the preprogrammed Ne-TVO-$t_{ES}$ characteristic map shown in FIG. 5. Second, engine output torque $t_{EH}$ estimation section S108 determines or calculates an engine torque estimate $t_{EH}$ based on the engine torque $t_{ES}$ map-retrieved, taking into account an engine dynamic characteristic, that is, a first-order time-lag of a time constant $T_{ED}$ (see the following expression (6)).

$$t_{EH} = t_{ES}/(1 + T_{ED} \cdot S) \quad (6)$$

A target lockup clutch engagement capacity $t_{LU}$ calculation section S107 arithmetically calculates a target lockup clutch engagement capacity $t_{LU}$ by subtracting target converter torque $t_{CNVC}$ from engine torque estimate $t_{EH}$ (see the following expression (7)).

$$t_{LU} = t_{EH} - t_{CNVC} \quad (7)$$

Figure 6:
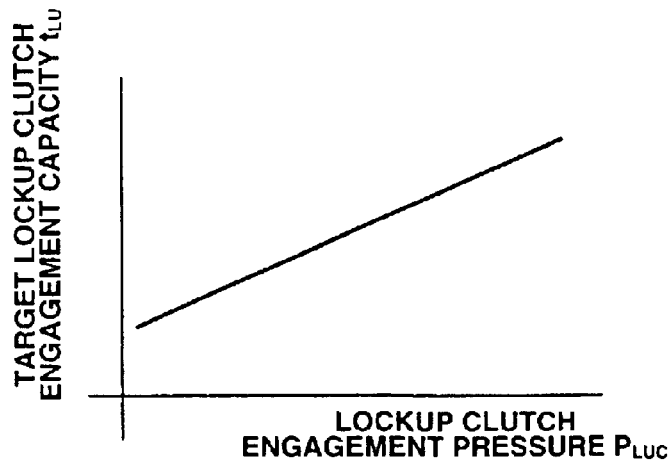
FIG. 6 is a characteristic diagram showing the relationship between a target lockup clutch engagement capacity $t_{LU}$ and a lockup clutch engagement pressure command value $P_{LUC}$.

A lockup clutch engagement pressure command value $P_{LUC}$ calculation section S109 determines a lockup clutch engagement pressure command value $P_{LUC}$ required to achieve the current value of target lockup clutch engagement capacity $t_{LU}$. Concretely, lockup clutch engagement pressure command value $P_{LUC}$ calculation section S109 retrieves lockup clutch engagement pressure command value $P_{LUC}$ based on the current value of target lockup clutch engagement capacity $t_{LU}$ from the preprogrammed $t_{LU}$–$P_{LUC}$ characteristic map shown in FIG. 6.

A solenoid drive signal $S_{DUTY}$ calculation section S110 determines desired solenoid-drive duty cycle value D of solenoid drive signal $S_{DUTY}$ based on lockup clutch engagement pressure command value $P_{LUC}$ retrieved, such that the actual lockup clutch engagement pressure is brought closer to the lockup clutch engagement pressure command value $P_{LUC}$. The previously-discussed sections S105–S110 serve as a drive signal determination section (S105–S110) that determines the drive signal ($S_{DUTY}$) based on the slip-rotation speed command value ($\omega_{SLPC}$).

Figure 3:
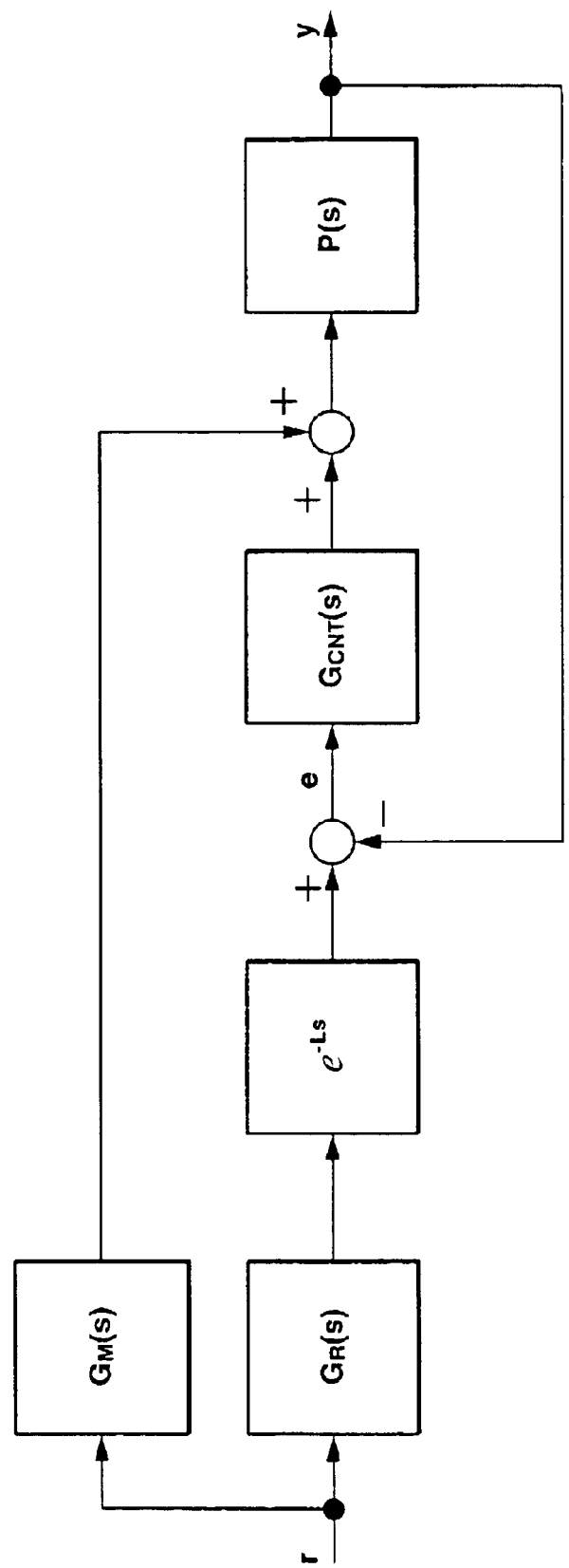
FIG. 3 is a block diagram showing essential units of the slip control system (or a torque-converter slip controller), relating to the block diagram of FIG. 2.

A dead time processing section S111 makes a dead-time processing to the output from first compensating filter S101A (the reference model), that is, first target slip-rotation speed correction value $\omega_{SLPTC1}$ (the reference-model output), taking into account a dead time of dynamic characteristics peculiar to the slip lock-up control system for the lockup clutch mechanism of torque converter 1, so as to produce a dead-time processed output (or a dead-time compensated output). The block diagram of FIG. 3 shows essential units of the slip lock-up control system of the embodiment, corresponding to first and second compensating filters S101A and S101B (containing the FF compensator) of the pre-compensator, dead time processing section S111, slip-rotation speed deviation $\omega_{SLPER}$ calculation section S102, and slip-rotation speed command value $\omega_{SLPC}$ calculation section S104 containing the FB compensator, shown in the block diagram of FIG. 2. In FIG. 3, r denotes a reference input, whereas y denotes an output.

Figure 7:
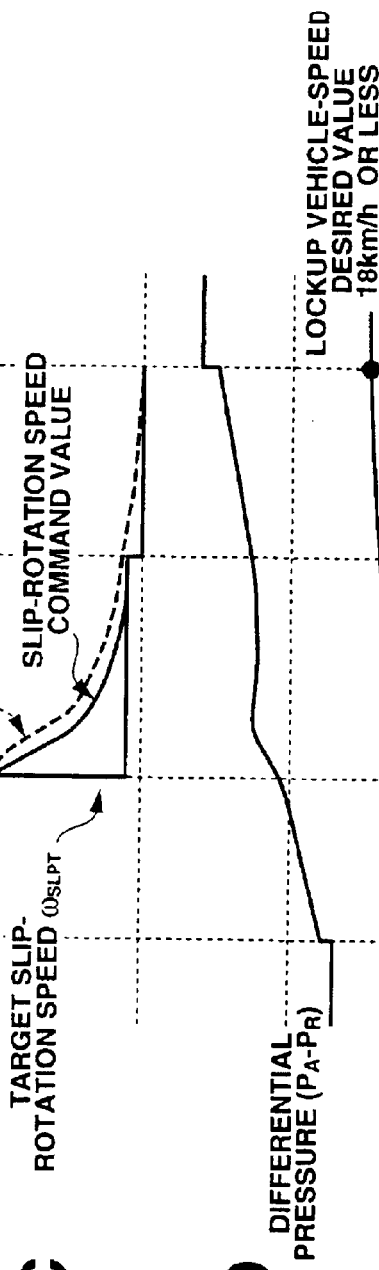
FIGS. 7A–7F are time charts showing the control action obtained by the improved slip control system of the embodiment shown in FIG. 2.

Referring now to FIGS. 7A–7F, there is shown the control action obtained by the slip lock-up control system of the embodiment indicated by the block diagram in FIG. 2. Concretely, FIG. 7A shows variations in engine speed Ne, FIG. 7B shows variations in the primary speed, that is, turbine speed $\omega_{TR}$, FIG. 7C shows variations in actual slip-rotation speed $\omega_{SLPR}$, target slip-rotation speed $\omega_{SLPT}$, and slip-rotation speed command value $\omega_{SLPC}$, FIG. 7D shows variations in differential pressure ($P_A$–$P_R$), FIG. 7E shows variations in vehicle speed VSP, and FIG. 7F shows variations in throttle opening TVO. At the time $t_0$ (a lockup action starting point), lockup clutch 2 begins to shift from the disengaged state to the engaged state. The time $t_3$ is a point of time at which lockup clutch 2 is fully engaged. During a time interval from the time $t_0$ to the time $t_1$, that is, the first period ($t_0$–$t_1$) of the time period ($t_0$–$t_3$) during which lockup clutch 2 shifts from the disengaged state (release state) to the fully-engaged state (lockup state), differential pressure ($P_A$–$P_R$) between lockup-clutch apply pressure $P_A$ and lockup-clutch release pressure $P_R$ rises by way of feedforward control (open-loop control) such that torque converter 1 shifts from the torque-converter state to the slip control state. At the point of time $t_1$, when the actual slip-rotation speed reduces to below a predetermined slip-rotation speed criterion, the processor of ECU 5 determines that the operating state of lockup clutch 2 has been shifted to the slip lockup state in which relative rotation between torque-converter input and output elements exists. Thus, at the time point $t_1$, the control mode of lockup clutch 2 is switched from feedforward control to feedback control, and simultaneously an internal variable of the FB compensator of slip-rotation speed command value $\omega_{SLPC}$ calculation section S104 is initialized. From $t_1$ (for the second period ($t_1$–$t_3$) of the time period ($t_0$–$t_3$)), differential pressure ($P_A$–$P_R$) is controlled by way of feedback control, such that actual slip-rotation speed $\omega_{SLPR}$ is brought closer to target slip-rotation speed $\omega_{SLPT}$. At a point of time $t_2$, a speed-change operation (a shift of the automatic transmission) begins to occur and the primary speed, i.e., turbine speed $\omega_{TR}$ tends to be kept substantially constant. Thus, at the time $t_2$, in order for lockup clutch 2 to be fully engaged, target slip-rotation speed $\omega_{SLPT}$ is adjusted to "0". As discussed above, the time period from $t_1$ to $t_2$ corresponds to a vehicle speed range in which torque converter 1 is conditioned in the slip lockup control state but a shift of the automatic transmission is not yet started. During this time period (or in this vehicle speed range), the primary speed, i.e., turbine speed $\omega_{TR}$ is in a process of increase. Thus, instead of adjusting target slip-rotation speed $\omega_{SLPT}$ to "0", target slip-rotation speed $\omega_{SLPT}$ is set or adjusted to a slight speed difference, such as 10 rpm, so as to permit a slight speed of relative rotation between torque-converter input and output elements.

Figure 10:
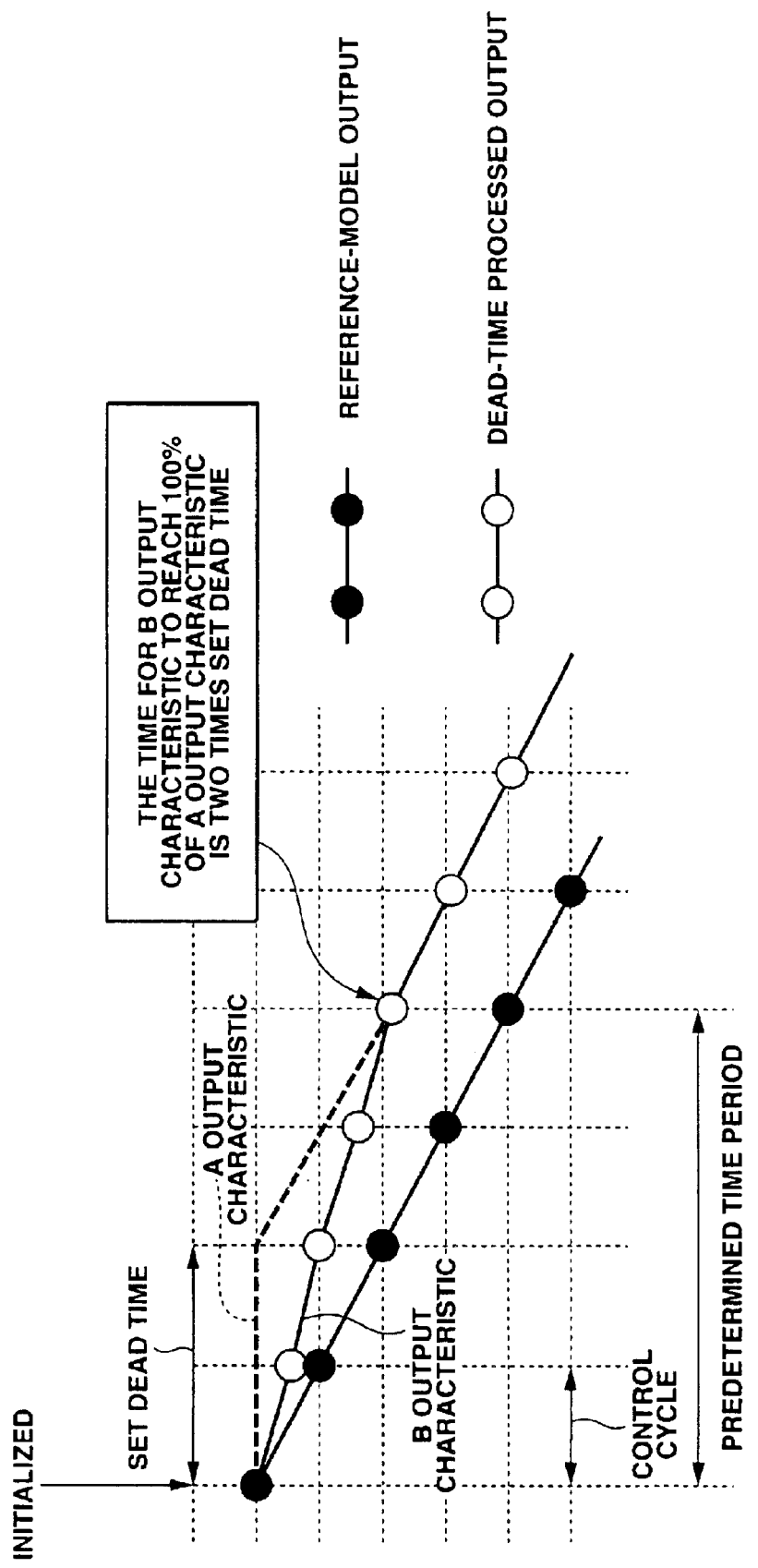
FIG. 10 is an output characteristic diagram explaining the relationship among a reference-model output, a dead-time compensated output (or a dead-time processed output) produced by the system of the embodiment, and a quick dead-time compensated output.

Referring now to FIG. 10, there is shown the comparison result among the essential output characteristic of the dead-time compensated output (or the dead-time processed output produced by dead time processing section S111) corresponding to the B output characteristic indicated by the voided circle in FIG. 10, the output characteristic of the dead-time uncompensated output (or the reference-model output indicated by the black dot in FIG. 10, in other words, first target slip-rotation speed correction value $\omega_{SLPTC1}$ produced by first compensating filter S101A of the pre-compensator), and the output characteristic of a so-called quick dead-time compensated output from a quick dead-time compensation system corresponding to the A output characteristic. The A output characteristic is indicated by the broken line for a predetermined time period $T_{transit}$, and is equal to the dead-time processed output (the B output characteristic indicated by the voided circle in FIG. 10) after the predetermined time period $T_{transit}$. As can be seen from the output characteristic diagram shown in FIG. 10, the set dead time is two times a predetermined sampling time interval or a predetermined control cycle (such as 20 milliseconds) of the slip control system. That is to say, assuming that the predetermined control cycle of the slip control system is 20 milliseconds, the set dead time is 40 milliseconds. At the initializing point at which switching from feedforward control to feedback control occurs and thus the internal variable of the FB compensator of slip-rotation speed command value $\omega_{SLPC}$ calculation section S104 is initialized, the dead time is temporarily set to "0", and as a result the output from dead time processing section S111 is identical to the reference-model output (see the point of intersection of the B output characteristic indicated by the voided circle and the reference-model output characteristic indicated by the black dot in FIG. 10). As can be seen from the former half (see part of the B output characteristic produced during the predetermined time period $T_{transit}$) of the B output characteristic indicated by the voided circle in FIG. 10, in the system of the embodiment the dead time is not instantaneously quickly considered and reflected in the slip-rotation speed command value. On the contrary, as can be appreciated from the A output characteristic shown in FIG. 10, in the quick dead-time compensation system the dead time is instantaneously quickly considered and reflected in the slip-rotation speed command value. That is to say, according to the system of the embodiment, the dead time is gradually considered and reflected in the slip-rotation speed command value with the predetermined time period $T_{transit}$ of transition from the reference-model output characteristic to the A output characteristic (the quick dead-time compensation system output characteristic). In the system of the shown embodiment, the predetermined time period $T_{transit}$ of transition from the reference-model output characteristic to the A output characteristic is set to two times the set dead time. Assuming that the set dead time is 40 milliseconds, the predetermined time period $T_{transit}$ of transition is set to 80 milliseconds. The previously-described B output characteristic, which is indicated by the voided circle in FIG. 10 and corresponds to the dead-time compensated output or the dead-time processed output produced by dead time processing section S111, is produced by performing a rounding process to the A output (the quick dead-time compensated output from the quick dead-time compensation system).

Figure 8:
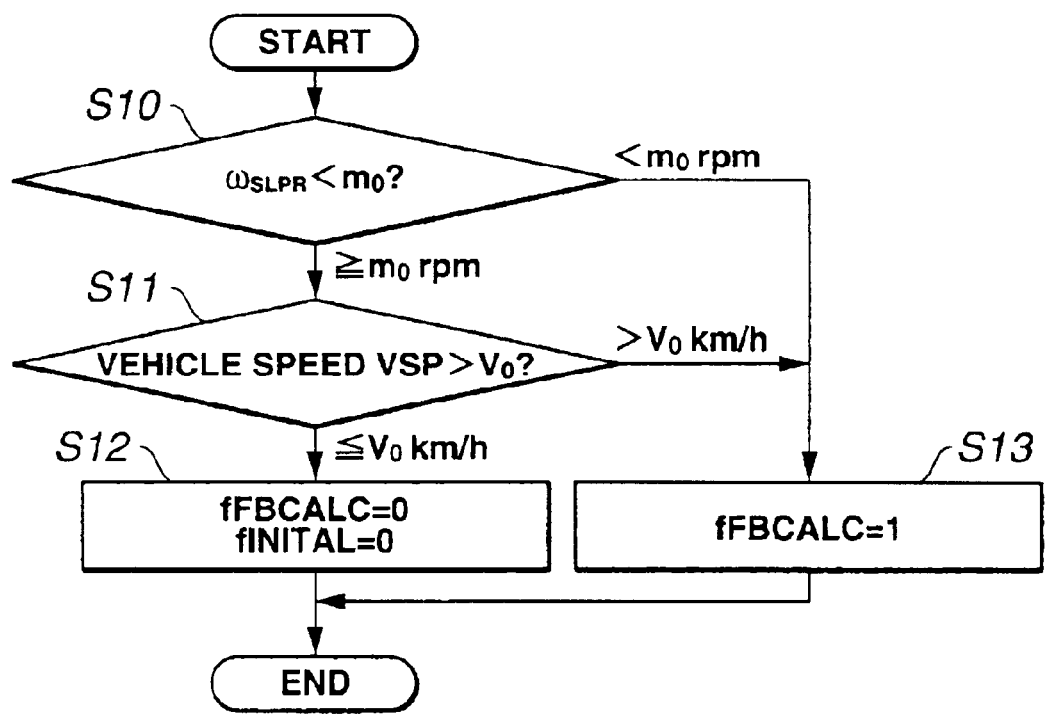
FIG. 8 is a flow chart showing a routine used to determine switching from feedforward control to feedback control.

Referring to FIG. 8, there is shown the flow chart of the routine needed to determine switching from feedforward control to feedback control. The routine of FIG. 8 is executed as time-triggered interrupt routines to be triggered every predetermined sampling time intervals such as 20 milliseconds.

At step S10, a check is made to determine whether actual slip-rotation speed $\omega_{SLPR}$ is less than a predetermined value $m_0$. When the first condition defined by the inequality $\omega_{SLPR} < m_0$ is satisfied and thus ECU 5 determines that lockup clutch 2 is conditioned in the slip lockup state in which relative rotation between torque-converter input and output elements exists, the routine proceeds from step S10 to step S13. At step S13, a feedback control indicative flag fFBCALC is set to "1" for the purpose of the transition to the feedback control mode. Conversely in case of $\omega_{SLPR} \geq m_0$, the routine proceeds from step S10 to step S11.

At step S11, a check is made to determine whether vehicle speed VSP is greater than a predetermined vehicle-speed threshold value $V_0$. When the second condition defined by the inequality VSP>$V_0$ is satisfied, the routine proceeds from step S11 to step S13, to set the feedback control indicative flag fFBCALC and to forcibly switch from the feedforward control mode to the feedback control mode. Conversely in case of VSP$\leq V_0$, the routine proceeds from step S11 to step S12.

When the previously-discussed first and second conditions are both unsatisfied, at step S12 the feedback control indicative flag fFBCALC and an initialization indicative flag fINITAL (described later) are both cleared to "0".

At step S13, as discussed above, for switching to the feedback control mode, feedback control indicative flag fFBCALC is set to "1".

Figure 9:
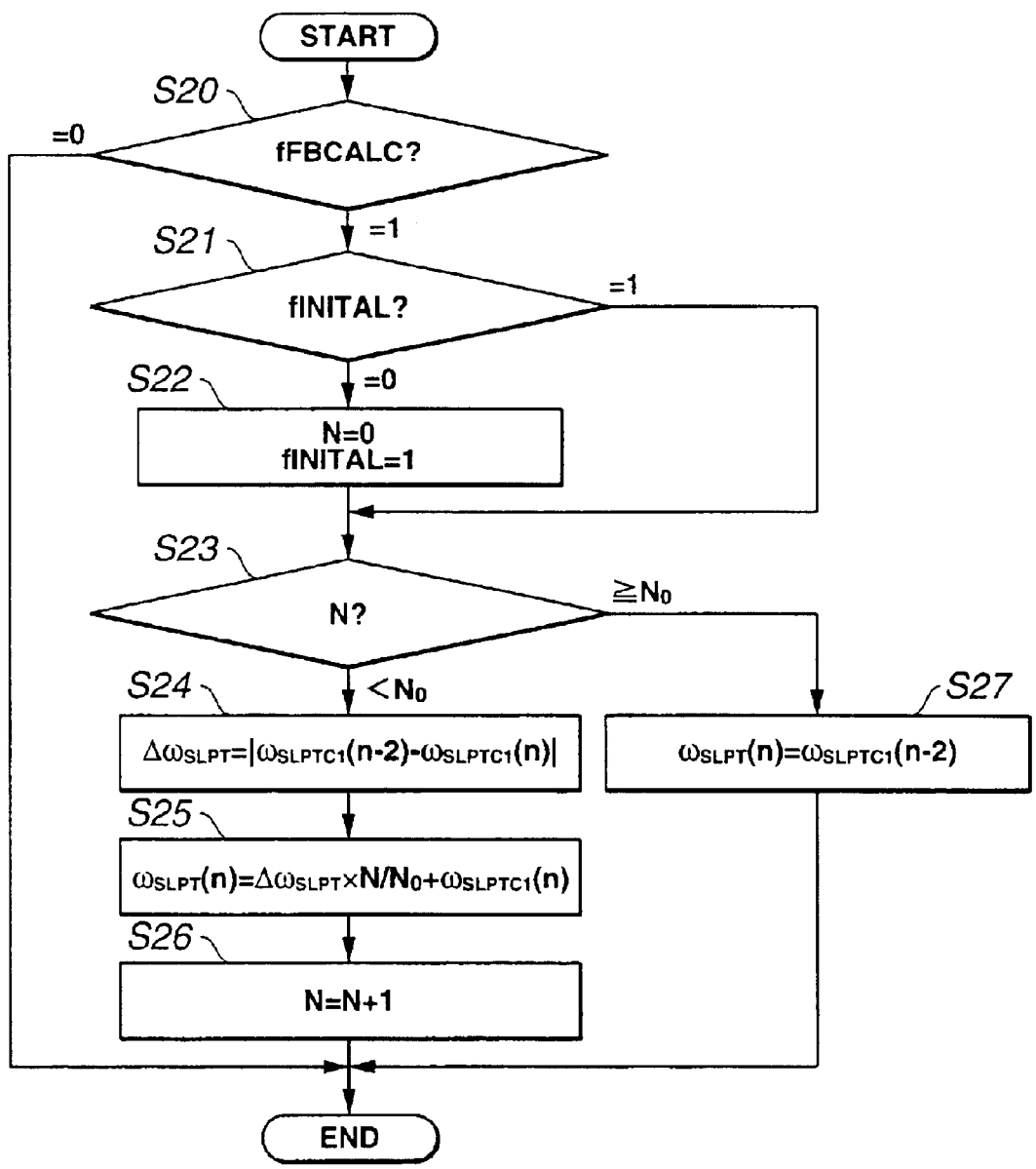
FIG. 9 is a flow chart showing a routine used to compensate for a target slip-rotation correction value, taking into account a dead time.

Referring to FIG. 9, there is shown the flow chart of the routine (arithmetic and logic operations) needed to compensate for the reference-model output (first target slip-rotation speed correction value $\omega_{SLPTC1}$ produced by first compensating filter S101A of the pre-compensator), and to finally calculate a slip-rotation speed command value $\omega_{SLPT}(n)$, while gradually considering the dead time, such that the dead time is reflected in slip-rotation command value $\omega_{SLPT}(n)$ with the predetermined time period $T_{transit}$ (corresponding to two times the set dead time).

First, at step S20, a check is made to determine whether feedback control indicative flag fFBCALC is set (=1) or reset (=0). When feedback control indicative flag fFBCALC is reset (that is, fFBCALC=0), ECU 5 determines that the system is in the feedforward control mode and thus the arithmetic and logic operations to be executed after switching to feedback control are unnecessary. Thus, one cycle of the control routine terminates. Conversely when feedback control indicative flag fFBCALC is set (that is, fFBCALC=1), ECU 5 determines that the current operating mode of the slip lock-up control system has already been shifted to the feedback control mode. Thus, in case of fFBCALC=1, the routine proceeds from step S20 to step S21.

At step S21, a check is made to determine, based on initialization indicative flag fINITAL, whether initialization, containing initialization of a counted value N (described later) and initialization of the internal variable of the FB compensator of slip-rotation speed command value $\omega_{SLPC}$ calculation section S104, to be executed at the switching point (at the initializing point) from feedforward control to feedback control, is required. When initialization indicative flag fINITAL remains reset (=0) after the condition defined by fFBCALC=1 is satisfied and therefore the routine has flowed from step S20 to step S21, ECU 5 determines that the initialization is required. Thus, in case of fFBCALC=1 and fINITAL=0, the routine proceeds from step S20 via step S21 to step S22.

At step S22, the counted value N of a counter is initialized to "0" and at the same time initialization indicative flag fINITAL is set to "1". Then, the routine proceeds from step S22 to step S23.

Conversely when initialization indicative flag fINITAL has already been set (=1) after the condition defined by fFBCALC=1 is satisfied and therefore the routine has flowed from step S20 to step S21, ECU 5 determines that the initialization has already been made. Thus, in case of fFBCALC=1 and fINITAL=1, the routine proceeds from step S20 via step S21 to step S23.

At step S23, a check is made to determine whether the counted value N is less than a predetermined counted value $N_0$. When the answer to step S23 is in the affirmative (N<$N_0$), the routine proceeds from step S23 to step S24. Conversely when the answer to step S23 is in the negative (N$\geq N_0$), the routine proceeds from step S23 to step S27. Predetermined counted value $N_0$ is set to be equivalent to the previously-described predetermined transition time period $T_{transit}$, needed to gradually consider and reflect the dead time in the slip-rotation speed command value. As already explained in reference to FIG. 10, in the system of the shown embodiment, the predetermined transition time period $T_{transit}$ is set to two times the set dead time.

At step S24, as the initial stage of calculation of a slip-rotation speed command value $\omega_{SLPT}(n)$ (=$\omega_{SLPC}$) in which the current dead time, based on the predetermined dead-time compensated output characteristic corresponding to the B output characteristic of FIG. 10 and given at the current control cycle, is considered and reflected, the processor of ECU 5 arithmetically calculates a difference $\Delta\omega_{SLPT}$ between the current value $\omega_{SLPTC1}(n)$ of reference-model output $\omega_{SLPTC1}$ and the quick dead-time compensated reference-model output (corresponding to the A output characteristic in FIG. 10) $\omega_{SLPTC1}(n-2)$, as follows.

$$\Delta\omega_{SLPT} = |\omega_{SLPTC1}(n-2) - \omega_{SLPTC1}(n)|$$

where $\omega_{SLPTC1}(n)$ means the reference-model output value calculated at the current control cycle, and $\omega_{SLPTC1}(n-2)$ means the reference-model output value calculated two cycles before. As described previously, the set dead time is set to be equal to two times the predetermined control cycle, and therefore the reference-model output value $\omega_{SLPTC1}(n-2)$ calculated two cycles before corresponds to the reference-model output in which the set dead time is considered and reflected.

At step S25, the current value $\omega_{SLPT}(n)$ of the slip-rotation speed command value is calculated based on the difference $\Delta\omega_{SLPT}$ calculated through step S24 and a ratio $N/N_0$ of the current counted value to predetermined counted value $N_0$ (corresponding to predetermined transition time period $T_{transit}$), from the following expression.

$$\omega_{SLPT}(n) = \Delta\omega_{SLPT} \times (N/N_0) + \omega_{SLPTC1}(n)$$

As appreciated from the above expression, when counted value N reaches the predetermined counted value $N_0$ (predetermined transition time period $T_{transit}$), the current slip-rotation speed command value $\omega_{SLPT}(n)$ becomes identical to the reference-model output value $\omega_{SLPTC1}(n-2)$ calculated two cycles before, because of $\omega_{SLPT}(n) = \Delta\omega_{SLPT} \times (N_0/N_0) + \omega_{SLPTC1}(n) = \Delta\omega_{SLPT} + \omega_{SLPTC1}(n) = |\omega_{SLPTC1}(n-2) - \omega_{SLPTC1}(n)| + \omega_{SLPTC1}(n) = \omega_{SLPTC1}(n-2)$ (see the converging point between the A and B output characteristics in FIG. 10).

At step S26, counted value N is incremented by "1" so as to measure the elapsed time from the initializing point (the switching point to feedback control).

At step S27, the current slip-rotation speed command value $\omega_{SLPT}(n)$ is set to the reference-model output value $\omega_{SLPTC1}(n-2)$ calculated two cycles before (corresponding to the reference-model output in which the set dead time is considered and reflected). That is, as the current slip-rotation speed command value $\omega_{SLPT}(n)$, the reference-model output value $\omega_{SLPTC1}(n-2)$, calculated two cycles before, in which the set dead time is considered and reflected, is output, because the predetermined counted value $N_0$ (predetermined transition time period $T_{transit}$) has expired.

Figure 11:
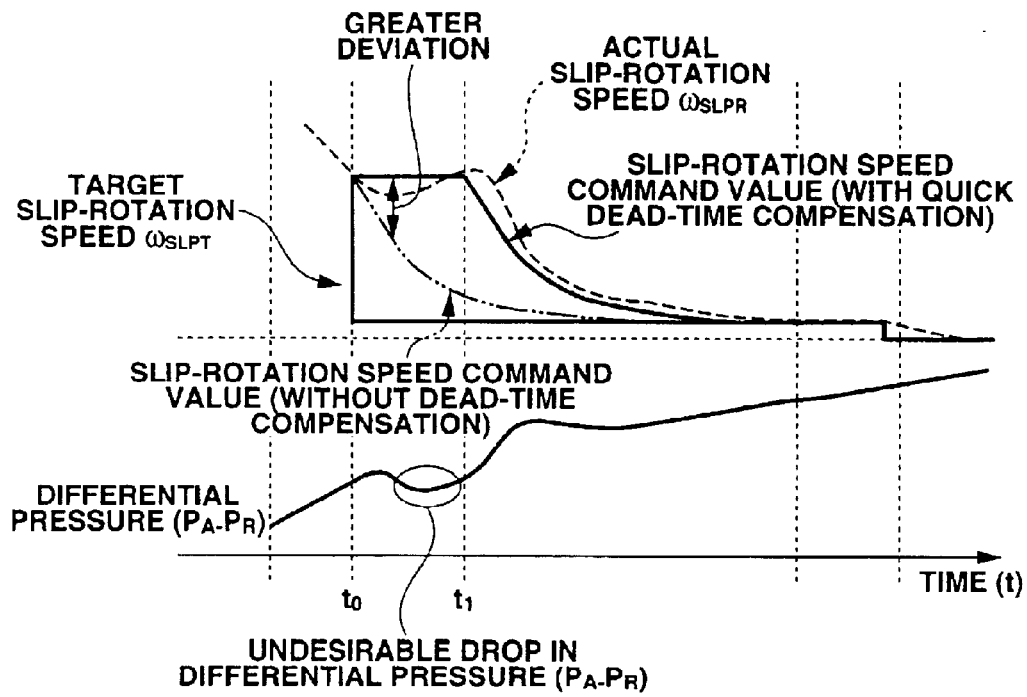
FIG. 11 is a time chart showing variations in an actual slip-rotation speed $\omega_{SLPR}$, a target slip-rotation speed $\omega_{SLPT}$, a quick dead-time compensated slip-rotation speed command value, a dead-time uncompensated slip-rotation speed command value, and an actual differential pressure ($P_A-P_R$).

The operation of the quick dead-time compensation system is hereunder described in detail in reference to the time chart shown in FIG. 11.

Regarding the time chart of FIG. 11, the time $t_0$ is the switching point (the initializing point) from feedforward control to feedback control. Thus, the response to the target slip-rotation speed, that is, the slip-rotation speed command value, is calculated or derived from the reference-model output, taking into account the actual slip-rotation command value $\omega_{SLPR}$, which is detected at the switching point $t_0$ and serves as an initial value. However, according to the quick dead-time compensation system, the slip-rotation speed command value is maintained constant during a time period from $t_0$ to $t_1$, substantially corresponding to the set dead time. Thus, the actual differential pressure $(P_A-P_R)$ between apply pressure $P_A$ and release pressure $P_R$ temporarily undesirably tends to drop during the time period from $t_0$ to $t_1$, owing to a temporary increase in actual slip-rotation speed $\omega_{SLPR}$. This is because differential pressure $(P_A-P_R)$ is risen by way of the feedforward control until the time $t_0$ is reached and actually there is a time delay until a change in differential pressure $(P_A-P_R)$ is reflected in the actual slip-rotation speed. Therefore, as shown in FIG. 11, as soon as the slip-rotation speed command value begins to reduce after differential pressure $(P_A-P_R)$ has been temporarily dropped, differential pressure $(P_A-P_R)$ begins to rise again. In such a case, there is an increased tendency for the engine to overrev due to a re-rise in differential pressure $(P_A-P_R)$.

Figure 12:
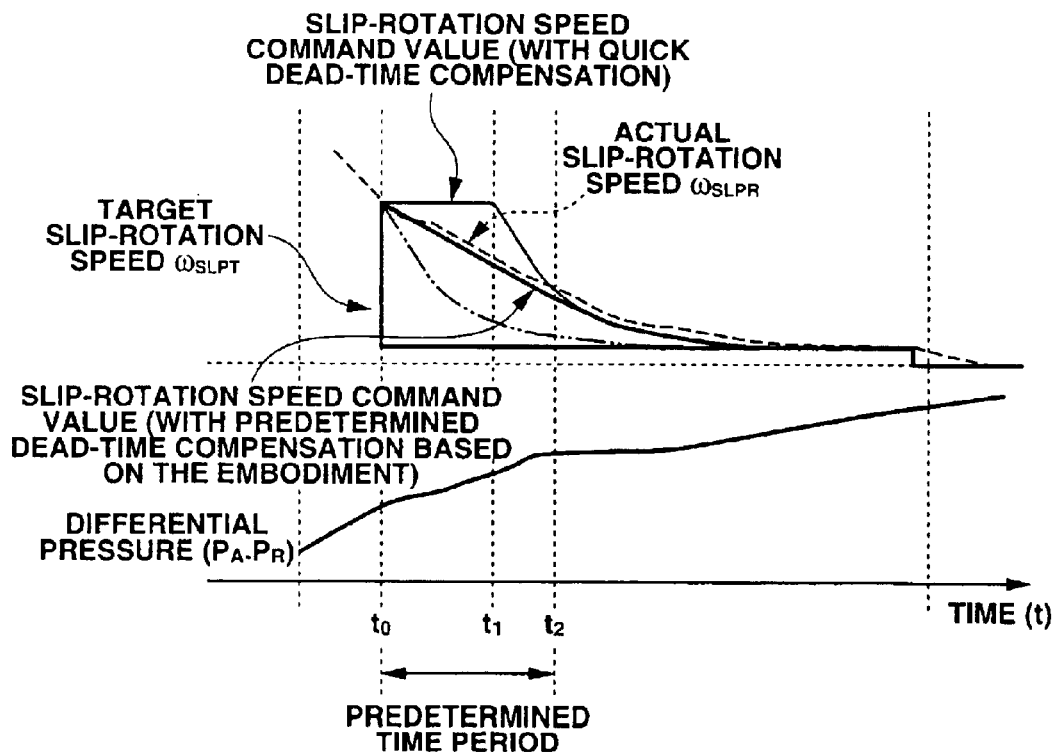
FIG. 12 is a time chart showing variations in actual slip-rotation speed $\omega_{SLPR}$, target slip-rotation speed $\omega_{SLPT}$, the quick dead-time compensated slip-rotation speed command value, the dead-time uncompensated slip-rotation speed command value, a predetermined dead-time compensated slip-rotation speed command value based on a predetermined dead-time compensation method achieved by the slip control system of the embodiment, and actual differential pressure ($P_A-P_R$).

The operation of the slip control system of the embodiment, capable of performing the predetermined dead time compensation (see the B output characteristic in FIG. 10), is hereunder described in detail in reference to the time chart shown in FIG. 12.

Regarding the time chart of FIG. 12, the time $t_0$ is the switching point (the initializing point) from feedforward control to feedback control. At this switching point, the slip-rotation speed command value is initialized or set to an initial value, that is, the latest up-to-date input information concerning actual slip-rotation speed $\omega_{SLPR}$. After $t_0$, gradually taking into account and reflecting the dead time in the slip-rotation speed command value in accordance with the predetermined dead-time compensated output characteristic (corresponding to the B output characteristic of FIG. 10), the slip-rotation speed command value is properly compensated for according to the predetermined dead-time compensation method of the system of the embodiment. Therefore, even during the time period from $t_0$ to $t_1$, the slip-rotation speed command value tends to moderately reduce and as a result differential pressure $(P_A-P_R)$ tends to rise moderately continually. This prevents the undesirable drop in differential pressure $(P_A-P_R)$ as discussed above, occurring just after the FF-to-FB switching point $t_0$, and consequently effectively suppressing the engine from over-revolving.

Figure 13A:
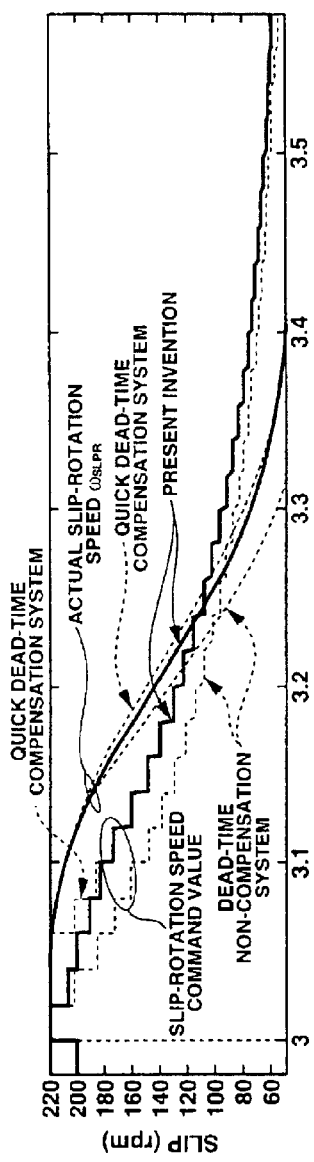
FIG. 13A is a time chart showing simulation results showing variations in actual slip-rotation speed $\omega_{SLPR}$ and the slip-rotation speed command value, obtained through three different control systems, namely a quick dead-time compensation system that a set dead time is quickly simply considered without any time period (without any time delay), the slip control system of the embodiment achieving the predetermined dead-time compensation, and a dead-time non-compensation system not executing any dead-time compensation.
Figure 13B:
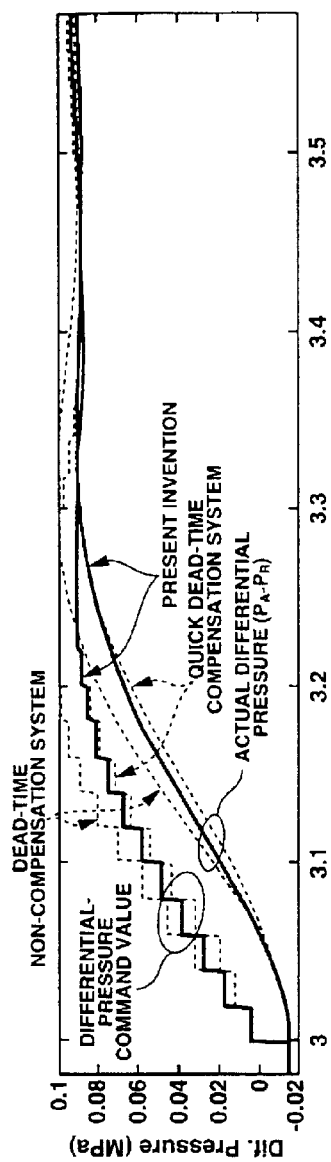
FIG. 13B is a time chart showing simulation results showing variations in actual differential pressure ($P_A-P_R$) and the differential pressure command value, obtained through the quick dead-time compensation system, the slip control system of the embodiment achieving the predetermined dead-time compensation, and the dead-time non-compensation system.
Figure 13C:
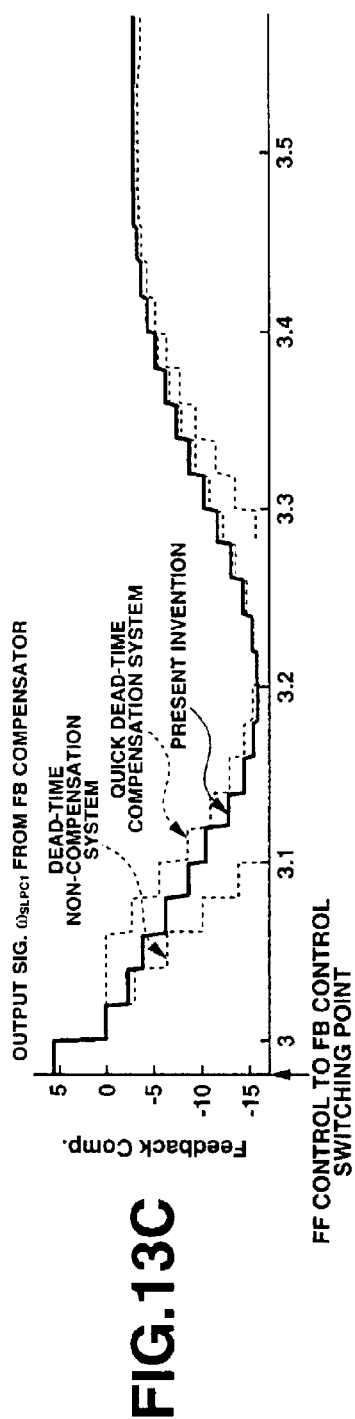
FIG. 13C is a time chart showing simulation results showing variations in the output signal value from a feedback compensator (see S104 of FIG. 2), obtained through the quick dead-time compensation system, the slip control system of the embodiment achieving the predetermined dead-time compensation, and the dead-time non-compensation system.
Figure 14:
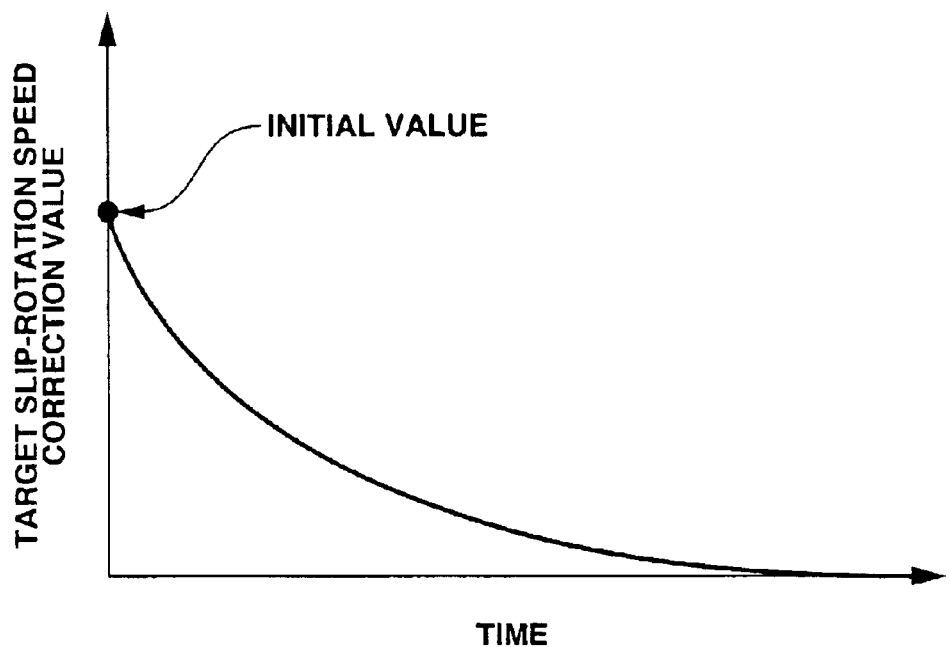
FIG. 14 is a characteristic diagram showing variations in the target slip-rotation speed correction value with respect to the elapsed time counted from the switching point from feedforward control to feedback control.

Referring now to FIGS. 13A–13B, there are shown simulation results obtained by three different control systems, namely the quick dead-time compensation system quickly simply considering the dead time, the slip control system of the embodiment achieving the predetermined dead-time compensation, and the dead-time non-compensation system not executing any dead-time compensation. FIGS. 13A, 13B, and 13C respectively show the relationship between actual slip-rotation speed $\omega_{SLPR}$ and the slip-rotation speed command value, the relationship between actual differential pressure $(P_A-P_R)$ and the differential pressure command value, and variations in the output signal value from the feedback compensator of slip-rotation speed command value $\omega_{SLPC}$ calculation section S104. In FIGS. 13A–13C, a time (3 seconds) is a feedforward-to-feedback switching point.

In case of the dead-time non-compensation system not taking into account any dead time, a system response is fast. However, the system output tends to overshoot with respect to target slip-rotation speed $\omega_{SLPT}$.

In case of the quick dead-time compensation system rapidly taking into account the dead time, there is no overshoot of the system output with respect to target slip-rotation speed $\omega_{SLPT}$. However, there is a drawback that the system response is somewhat slow.

In contrast to the above, as shown in the solid line in FIGS. 13A–13C, in case of the slip control system of the embodiment achieving the predetermined dead-time compensation, there is no overshoot of the system output with respect to target slip-rotation speed $\omega_{SLPT}$. Additionally, the system response of the slip control system of the embodiment is faster than that of the quick dead-time compensation system. This ensures the smooth system output characteristic after the transition from the feedforward control to the feedback control.

The simulation results shown in FIGS. 13A–13C are assured by the inventors of the present invention under a vehicle's running condition that differential pressure ($P_A-P_R$) of lockup clutch 2 is rising comparatively moderately before switching from the feedforward control to the feedback slip control. For this reason, in FIGS. 13A–13C, the difference between the simulation result obtained by the predetermined dead-time compensation method of the slip control system of the embodiment and the simulation result obtained by the quick dead-time compensation system quickly simply considering the dead time is slight. On the contrary, assuming that simulations are made under a vehicle's running condition that a time rate of rise in differential pressure ($P_A-P_R$) of lockup clutch 2 is comparatively great during the feedforward control mode, the difference between the simulation result obtained by the predetermined dead-time compensation method of the slip control system of the embodiment and the simulation result obtained by the quick dead-time compensation system quickly simply considering the dead time may be remarkable. This is because a time delay of the resulting change in slip-rotation speed, occurring owing to the remarkable rise in differential pressure ($P_A-P_R$) of lockup clutch 2, is not negligible.

Figure 15:
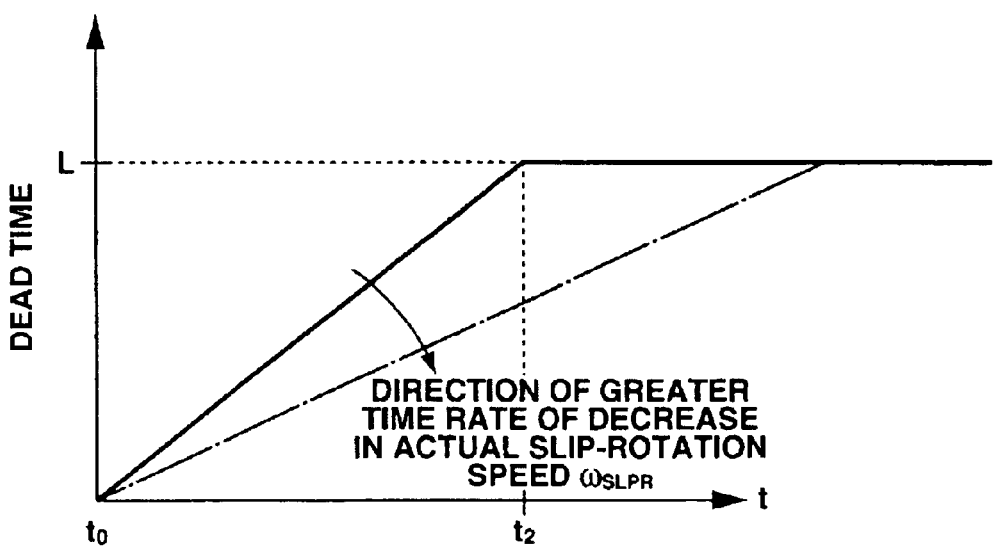
FIG. 15 is an explanatory drawing explaining a way to determine a dead time based on both the elapsed time counted from the switching point from feedforward control to feedback control and the time rate of decrease in actual slip-rotation speed $\omega_{SLPR}$ calculated just before the switching point.

The system response (variations in actual slip-rotation speed $\omega_{SLPR}$) to variations in differential pressure ($P_A-P_R$) varies in proportion to the magnitude of differential pressure ($P_A-P_R$). Therefore, it is effective or preferable to set or determine the previously-described predetermined transition time period $T_{transit}$ depending on the differential pressure ($P_A-P_R$) (in other words, the lockup clutch engagement pressure or the lockup clutch engagement capacity) produced just before the feedforward-to-feedback switching point and/or the time rate of decrease in actual slip-rotation speed $\omega_{SLPR}$ (in other words, the time rate of increase in the lockup clutch engagement pressure or the time rate of increase in the lockup clutch engagement capacity). FIG. 15 shows an example of setting of the dead time and the relationship between predetermined transition time period $T_{transit}$ and the time rate of decrease in actual slip-rotation speed $\omega_{SLPR}$. According to the predetermined dead-time setting characteristic (the predetermined dead time characteristic) shown in FIG. 15, the greater the time rate of decrease in actual slip-rotation speed $\omega_{SLPR}$, the longer the predetermined transition time period $T_{transit}$. Concretely, as indicated by the solid line in FIG. 15, in case of a relatively small time rate of decrease in actual slip-rotation speed $\omega_{SLPR}$, the dead time is "0" at the time $t_0$, and gradually increases from "0" to a dead-time equivalent value L (corresponding to the previously-discussed set dead time) peculiar to the slip control system in a linear fashion for a time period ($t_0-t_2$) from $t_0$ to $t_2$. When the time period ($t_0-t_2$) has expired, the dead time is fixed to the dead-time equivalent value L. On the other hand, as indicated by the one-dotted line in FIG. 15, in case of a relatively great time rate of decrease in actual slip-rotation speed $\omega_{SLPR}$, the dead time is "0" at the time $t_0$, and gradually increases from "0" to a dead-time equivalent value L (corresponding to the previously-discussed set dead time) in a linear fashion for a relatively longer time period from the time $t_0$ to a time after $t_2$. When the relatively longer time period has expired, the dead time is fixed to the dead-time equivalent value L. The aforementioned setting of predetermined transition time period $T_{transit}$ (or setting of the dead time for predetermined transition time period $T_{transit}$) provides the following effects.

As set forth above, the deviation between actual slip-rotation speed $\omega_{SLPR}$ and the target slip-rotation speed correction value (or the slip-rotation speed command value), obtained just after the feedforward-to-feedback switching point, tends to increase, as the time rate of decrease in actual slip-rotation speed $\omega_{SLPR}$, obtained before the feedforward-to-feedback switching point, increases. Therefore, as explained by reference to FIG. 15, predetermined transition time period $T_{transit}$ tends to be relatively longer in accordance with an increase of in the time rate of decrease in actual slip-rotation speed $\omega_{SLPR}$, obtained before the feedforward-to-feedback switching point. This effectively suppresses the deviation between actual slip-rotation speed $\omega_{SLPR}$ and the target slip-rotation speed correction value (or the slip-rotation speed command value), obtained just after the feedforward-to-feedback switching point, from undesirably increasing.

As will be appreciated from the above, in the slip control system of the embodiment, the target slip-rotation speed correction value (exactly, first target slip-rotation speed correction value $\omega_{SLPTC1}$ pre-compensated and produced by first compensating filter S101A of the pre-compensator, that is, the reference-model output) is properly compensated for by way of the predetermined dead-time compensation method of the embodiment, gradually taking into account and reflecting the dead time component contained in the slip control system in the target slip-rotation speed correction value. The dead-time compensated or dead-time processed output is supplied to the feedback compensator (the feedback control). Thus, irrespective of the presence of the dead time contained in the slip control system, the feedback control input downstream of the pre-compensator can be properly compensated for and adjusted to a suitable value by way of the predetermined dead-time compensation achieved by the system of the embodiment. This enhances the control stability of the feedback control system, thus resulting in less overshoot and undershoot.

Additionally, according to the slip control system of the embodiment, at the feedforward-to-feedback switching point, the pre-compensator is initialized such that the target slip-rotation speed correction value is initialized to the latest up-to-date information regarding the actual slip-rotation speed $\omega_{SLPR}$ just after switching to the feedback control, and also the dead time is reset to "0". In the slip control system of the embodiment, as shown in FIG. 15, the dead time is variably set, adjusted or determined such that the dead time gradually increases from "0" to the predetermined dead-time equivalent value L peculiar to the slip control system with the predetermined transition time period $T_{transit}$ (a predetermined time delay) from the feedforward-to-feedback switching point. Therefore, the system of the embodiment further provides the following effects.

According to the previously-described quick dead-time compensation system that a set dead time is quickly simply considered without any time period (without any time delay), as appreciated from FIG. 11, the deviation between actual slip-rotation speed $\omega_{SLPR}$ and the target slip-rotation speed correction value (or the slip-rotation speed command value), obtained just after the feedforward-to-feedback switching point, becomes great, and whereby the feedback-controlled variable also becomes great. This results in great fluctuations in the lockup clutch engagement capacity, in other words, undesirable power-train shock. On the contrary, according to the slip control system of the embodiment achieving the predetermined dead-time compensation that the dead time gradually increases from "0" to the predetermined dead-time equivalent value L peculiar to the slip control system for the predetermined transition time period $T_{transit}$ from the feedforward-to-feedback switching point, as shown in FIGS. 10 and 12, the dead time is rounded by way of the rounding process (see the change from the A output characteristic to the B output characteristic in FIG. 10 and the change from the characteristic indicative of the slip-rotation speed command value obtained by the quick dead-time compensation system and indicated by the fine solid line shown in FIG. 12 to the characteristic indicative of the slip-rotation speed command value obtained by the slip control system of the embodiment and indicated by the heavy solid line in FIG. 12). Therefore, in the system of the embodiment, it is possible to effectively prevent or suppress the deviation between actual slip-rotation speed $\omega_{SLPR}$ and the target slip-rotation speed correction value (or the slip-rotation speed command value), obtained just after the feedforward-to-feedback switching point, from undesiredly increasing, thus properly reducing the feedback-controlled variable. The properly reduced feedback-controlled variable effectively suppresses fluctuations in the lockup clutch engagement capacity, in other words, undesirable power-train shock.

The entire contents of Japanese Patent Application No. 2002-383017 (filed Dec. 5, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A slip control system of an automatic transmission with a torque converter, comprising:
    a lockup clutch, which is disposed between input and output elements of the torque converter, and whose engagement capacity is changeable for adjusting an actual slip-rotation speed between the input and output elements; and
    a control unit that feedback-controls the engagement capacity, the control unit comprising:
        (a) a target slip-rotation speed calculation section that estimates a target slip-rotation speed based on engine-and-vehicle operating conditions;
        (b) a pre-compensating section that pre-compensates for the target slip-rotation speed to produce a target slip-rotation speed correction value;
        (c) a slip-rotation speed deviation calculation section that calculates a slip-rotation speed deviation between the target slip-rotation speed correction value and the actual slip-rotation speed;
        (d) a feedback compensating section that feedback-controls the engagement capacity based on the slip-rotation speed deviation to bring the actual slip-rotation speed closer to the target slip-rotation speed; and
        (e) a dead-time processing section that compensates for the target slip-rotation speed correction value, considering a dead time of dynamic characteristics peculiar to the slip control system in the target slip-rotation speed correction value, to supply a dead-time compensated output to the feedback compensating section.

2. The slip control system as claimed in claim 1, wherein:
    the slip control system comprises a feedforward control system that controls the engagement capacity by open-loop control for a first time period of an automatically locked-up time period during which the lockup clutch shifts from a release state to a fully-engaged state, and a feedback control system that controls the engagement capacity by closed-loop control for a second time period of the automatically locked-up time period, and wherein at a switching point from the open-loop control to the closed-loop control the pre-compensating section is initialized and simultaneously the dead time is reset to zero, and the dead time is variably adjusted to gradually increase from zero to a predetermined dead-time equivalent value peculiar to the slip control system with a predetermined transition time period from the switching point.

3. The slip control system as claimed in claim 2, wherein:
    the predetermined transition time period is determined depending on a time rate of increase in the engagement capacity controlled by open-loop control during the first time period.

4. The slip control system as claimed in claim 3, wherein:
    the predetermined transition time period lengthens, as the time rate of increase in the engagement capacity controlled by open-loop control increases.

5. The slip control system as claimed in claim 2, wherein:
    the predetermined transition time period is determined depending on the engagement capacity controlled by open-loop control during the first time period.

6. The slip control system as claimed in claim 5, wherein:
    the predetermined transition time period lengthens, as the engagement capacity controlled by open-loop control increases.

7. A slip control system of an automatic transmission with a torque converter, comprising:
    a lockup clutch, which is disposed between input and output elements of the torque converter, and whose engagement capacity is changeable for adjusting an actual slip-rotation speed between the input and output elements; and
    a control unit that feedback-controls the engagement capacity of the lock-up clutch, the control unit comprising:
        (a) a target slip-rotation speed calculation section that estimates a target slip-rotation speed based on engine-and-vehicle operating conditions;
        (b) a pre-compensating section that pre-compensates for the target slip-rotation speed to produce a target slip-rotation speed correction value;
        (c) a slip-rotation speed deviation calculation section that calculates a slip-rotation speed deviation between the target slip-rotation speed correction value and the actual slip-rotation speed;
        (d) a feedback compensating section that feedback-controls the engagement capacity of the lock-up clutch based on the slip-rotation speed deviation to bring the actual slip-rotation speed closer to the target slip-rotation speed; and
        (e) a dead-time processing section that compensates for the target slip-rotation speed correction value to reflect a dead time of dynamic characteristics peculiar to the slip control system in the target slip-rotation speed correction value, and supplies a dead-time compensated output to the feedback compensating section, the dead time being variable in accordance with a predetermined dead time characteristic.

8. The slip control system as claimed in claim 7, wherein:
    the slip control system comprises a feedforward control system that controls the engagement capacity by open-loop control for a first time period of an automatically locked-up time period during which the lockup clutch shifts from a release state to a fully-engaged state, and a feedback control system that controls the engagement capacity by closed-loop control for a second time period of the automatically locked-up time period, and wherein at a switching point from the open-loop control to the closed-loop control the pre-compensating section is initialized, so that the target slip-rotation speed correction value is initialized to the actual slip-rotation speed obtained at the switching point to the feedback control, and simultaneously the dead time is reset to zero, and the dead time is variably adjusted to gradually increase from zero to a predetermined dead-time equivalent value peculiar to the slip control system with a predetermined transition time period from the switching point.

9. The slip control system as claimed in claim 8, wherein:

the predetermined transition time period is determined depending on at least one of the engagement capacity controlled by open-loop control during the first time period and a time rate of increase in the engagement capacity controlled by open-loop control during the first time period.

10. The slip control system as claimed in claim 9, wherein:

the predetermined transition time period lengthens, as at least one of the engagement capacity controlled by open-loop control and the time rate of increase in the engagement capacity controlled by open-loop control increases.

11. A slip control system of an automatic transmission with a torque converter, comprising:

a lockup clutch, which is disposed between input and output elements of the torque converter, and whose engagement capacity is changeable for adjusting an actual slip-rotation speed between the input and output elements;

a slip control valve that is responsive to a signal pressure for changing a differential pressure between a lockup-clutch apply pressure and a lockup-clutch release pressure;

a lockup solenoid valve that generates the signal pressure in response to a drive signal for changing the differential pressure via the slip control valve; and a control unit that feedback-controls the engagement capacity of the lock-up clutch by outputting the drive signal to the lockup solenoid valve, the control unit comprising:

(a) a target slip-rotation speed calculation section that estimates a target slip-rotation speed based on engine-and-vehicle operating conditions;

(b) a pre-compensating section comprising (i) a first compensating filter that pre-compensates for the target slip-rotation speed to produce a first target slip-rotation speed correction value corresponding to a reference-model output from an expression $\omega_{SLPTC1}=G_R(s)\times\omega_{SLPT}$ where $\omega_{SLPTC1}$ is the first target slip-rotation speed correction value, $G_R(s)$ is a reference model that is set as a transfer function suited to a desired response determined based on designer's wishes, and $\omega_{SLPT}$ is the target slip-rotation speed, and (ii) a second compensating filter that pre-compensates for the target slip-rotation speed to produce a second target slip-rotation speed correction value from an expression $\omega_{SLPTC2}=G_M(s)\times\omega_{SLPT}$ where $G_M(s)$ corresponds to a feed-forward compensator, which is defined by an expression $G_M(s)=G_R(s)/P(s)$, where $G_R(s)$ is the reference model and P(s) is a transfer function that is obtained by modeling a lockup-clutch slip-rotation section serving as a controlled system;

(c) a slip-rotation speed deviation calculation section that calculates a slip-rotation speed deviation between the target slip-rotation speed correction value and the actual slip-rotation speed;

(d) a feedback compensating section that feedback-controls the engagement capacity of the lock-up clutch based on the slip-rotation speed deviation to bring the actual slip-rotation speed closer to the target slip-rotation speed, the feedback compensating section comprising a feedback compensator that produces a first slip-rotation speed command value suited to reduce the slip-rotation speed deviation and an adder that produces a slip-rotation speed command value by adding the first slip-rotation speed command value to the second target slip-rotation speed correction value;

(e) a dead-time processing section that compensates for the first target slip-rotation speed correction value to reflect a dead time of dynamic characteristics peculiar to the slip control system in the first target slip-rotation speed correction value, and supplies a dead-time compensated output to the feedback compensator, the dead time being variable in accordance with a predetermined dead time characteristic; and (f) a drive signal determination section that determines the drive signal based on the slip-rotation speed command value.

12. The slip control system as claimed in claim 11, wherein:

the feedback compensator comprises a proportional-plus-integral controller that is defined by an expression $\omega_{SLPC1}=K_P\cdot\omega_{SLPER}+(K_I/s)\cdot\omega_{SLPER}$ where $K_P$ is a proportional gain, $K_I$ is an integral gain, s is a differential operator, and $\omega_{SLPER}$ is the slip-rotation speed deviation.

13. The slip control system as claimed in claim 12, wherein:

the slip control system controls the engagement capacity by open-loop control for a first time period of an automatically locked-up time period during which the lockup clutch shifts from a release state to a fully-engaged state, and controls the engagement capacity by closed-loop control for a second time period of the automatically locked-up time period, and wherein at a switching point from the open-loop control to the closed-loop control the first compensating filter is initialized, so that the first target slip-rotation speed correction value is initialized to the actual slip-rotation speed obtained at the switching point to the feedback control, and simultaneously the dead time is reset to zero, and the dead time is variably adjusted to gradually increase from zero to a predetermined dead-time equivalent value peculiar to the slip control system with a predetermined transition time period from the switching point.

14. The slip control system as claimed in claim 13, wherein:

the predetermined transition time period is determined depending on at least one of the engagement capacity controlled by open-loop control during the first time period and a time rate of increase in the engagement capacity controlled by open-loop control during the first time period.

15. The slip control system as claimed in claim 14, wherein:

the predetermined transition time period lengthens, as at least one of the engagement capacity controlled by open-loop control and the time rate of increase in the engagement capacity controlled by open-loop control increases.

16. The slip control system as claimed in claim 13, wherein:

the predetermined transition time period is determined depending on at least one of the differential pressure produced by open-loop control during the first time period and a time rate of increase in the differential pressure controlled by open-loop control during the first time period.

17. The slip control system as claimed in claim 16, wherein:

the predetermined transition time period lengthens, as at least one of the differential pressure produced by open-loop control and the time rate of increase in the differential pressure produced by open-loop control increases.

18. A slip control system of an automatic transmission with a torque converter, comprising:

a lockup clutch, which is disposed between input and output elements of the torque converter, and whose engagement capacity is changeable for adjusting an actual slip-rotation speed between the input and output elements; and a control unit that feedback-controls the engagement capacity, the control unit comprising:
  (a) a target slip-rotation speed calculation means for estimating a target slip-rotation speed based on engine-and-vehicle operating conditions;
  (b) a pre-compensating means for pre-compensating for the target slip-rotation speed to produce a target slip-rotation speed correction value;
  (c) a slip-rotation speed deviation calculation means for calculating a slip-rotation speed deviation between the target slip-rotation speed correction value and the actual slip-rotation speed;
  (d) a feedback compensating means for feedback-controlling the engagement capacity based on the slip-rotation speed deviation to bring the actual slip-rotation speed closer to the target slip-rotation speed; and
  (e) a dead-time processing means for compensating for the target slip-rotation speed correction value, considering a dead time of dynamic characteristics peculiar to the slip control system in the target slip-rotation speed correction value, to supply a dead-time compensated output to the feedback compensating section.

19. A method of controlling a speed of relative rotation between input and output elements of a lockup torque converter of an automatic transmission employing a lockup clutch, which is disposed between the input and output elements, and whose engagement capacity is changeable for adjusting an actual slip-rotation speed between the input and output elements, the method comprising:

estimating a target slip-rotation speed based on engine-and-vehicle operating conditions;

pre-compensating for the target slip-rotation speed to produce a target slip-rotation speed correction value;

calculating a slip-rotation speed deviation between the target slip-rotation speed correction value and the actual slip-rotation speed;

feedforward-controlling the engagement capacity by open-loop control for a first time period of an automatically locked-up time period during which the lockup clutch shifts from a release state to a fully-engaged state;

feedback-controlling the engagement capacity of the lock-up clutch based on the slip-rotation speed deviation to bring the actual slip-rotation speed closer to the target slip-rotation speed for a second time period of the automatically locked-up time period; and compensating for the target slip-rotation speed correction value to reflect a dead time of dynamic characteristics peculiar to a slip control system in the target slip-rotation speed correction value, the dead time being variable in accordance with a predetermined dead time characteristic, so that at a switching point from the feedforward control to the feedback control the dead time is reset to zero, and that the dead time is variably adjusted to gradually increase from zero to a predetermined dead-time equivalent value peculiar to the slip control system with a predetermined transition time period from the switching point.

20. The method as claimed in claim 19, wherein:

the predetermined transition time period lengthens, as at least one of the engagement capacity controlled by open-loop control and a time rate of increase in the engagement capacity controlled by open-loop control increases.

* * * * *